United States Patent
Yoshizawa

(10) Patent No.: US 8,077,756 B2
(45) Date of Patent: Dec. 13, 2011

(54) SIGNAL TRANSMITTING METHOD, TRANSMITTING APPARATUS, AND RECEIVING APPARATUS USED FOR THE SIGNAL TRANSMITTING METHOD

(75) Inventor: Hideki Yoshizawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 614 days.

(21) Appl. No.: 12/329,508

(22) Filed: Dec. 5, 2008

(65) Prior Publication Data

US 2009/0232190 A1    Sep. 17, 2009

(30) Foreign Application Priority Data

Mar. 17, 2008   (JP) ................................. 2008-068473

(51) Int. Cl.
   *H04B 1/707*   (2011.01)
(52) U.S. Cl. ........ 375/146; 375/140; 375/141; 375/142; 375/143; 375/144; 375/145; 375/147; 375/148; 375/149; 375/150; 375/316; 375/295

(58) Field of Classification Search .................. 375/146, 375/140, 141, 142, 143, 144, 145, 147, 148, 375/149, 150, 316, 295
See application file for complete search history.

(56) References Cited

U.S. PATENT DOCUMENTS 6,389,438 B1    5/2002  Zhou

FOREIGN PATENT DOCUMENTS

JP    11-312952    11/1999

*Primary Examiner* — Siu Lee
(74) *Attorney, Agent, or Firm* — Myers Wolin, LLC.

(57) ABSTRACT

A disclosed signal transmitting method includes the steps of a) categorizing plural digital signals, obtained by performing A/D conversion on plural analog signals consecutively arranged in a time direction, into plural signal groups in an order starting from lower bits of the plural digital signals, b) performing code spreading on the plural digital signals by using a different spread frequency for each signal group and using different spread codes for each bit, c) multiplexing the spread digital signals, and d) transmitting the multiplexed plural digital signals.

12 Claims, 24 Drawing Sheets

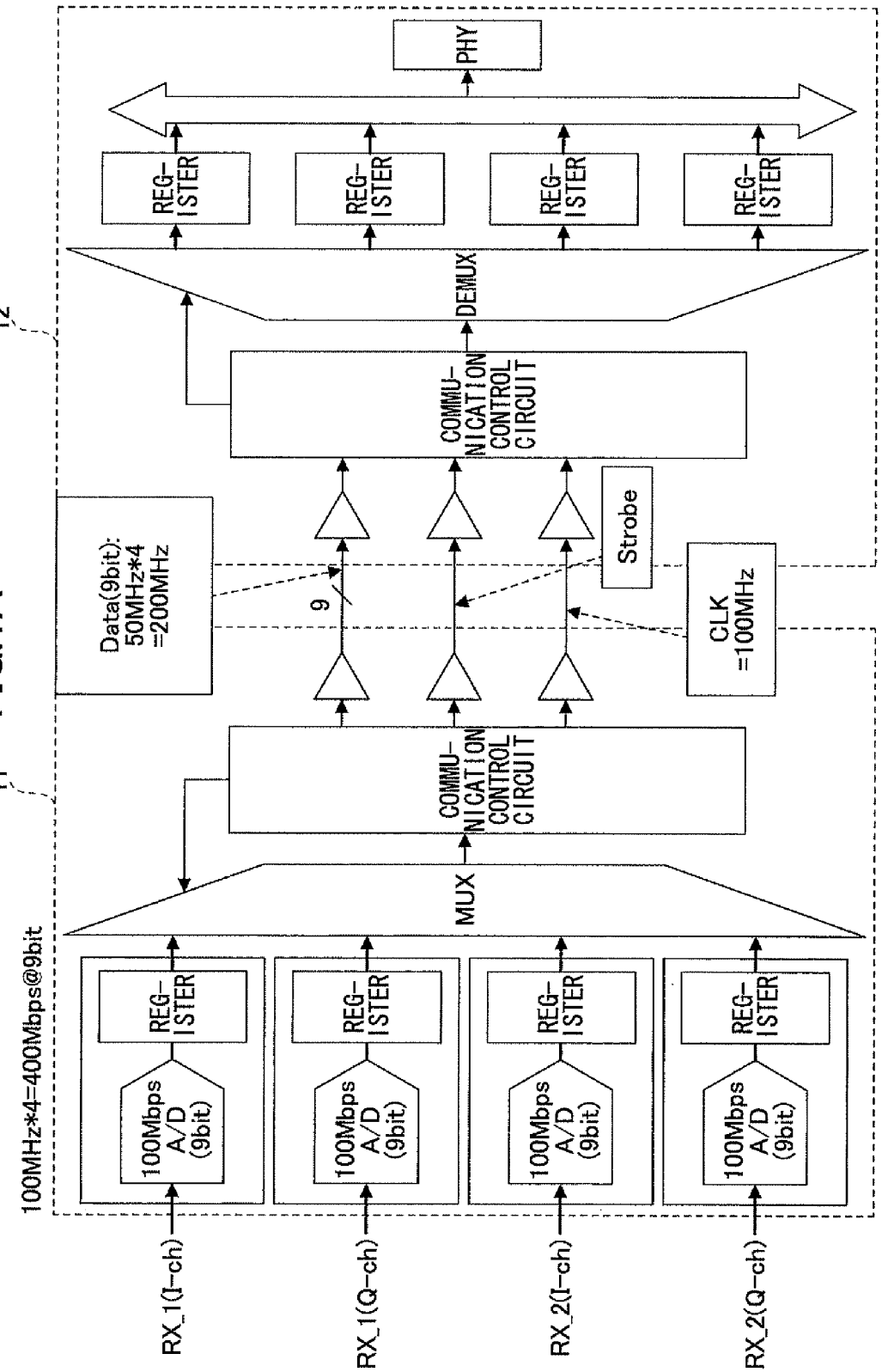

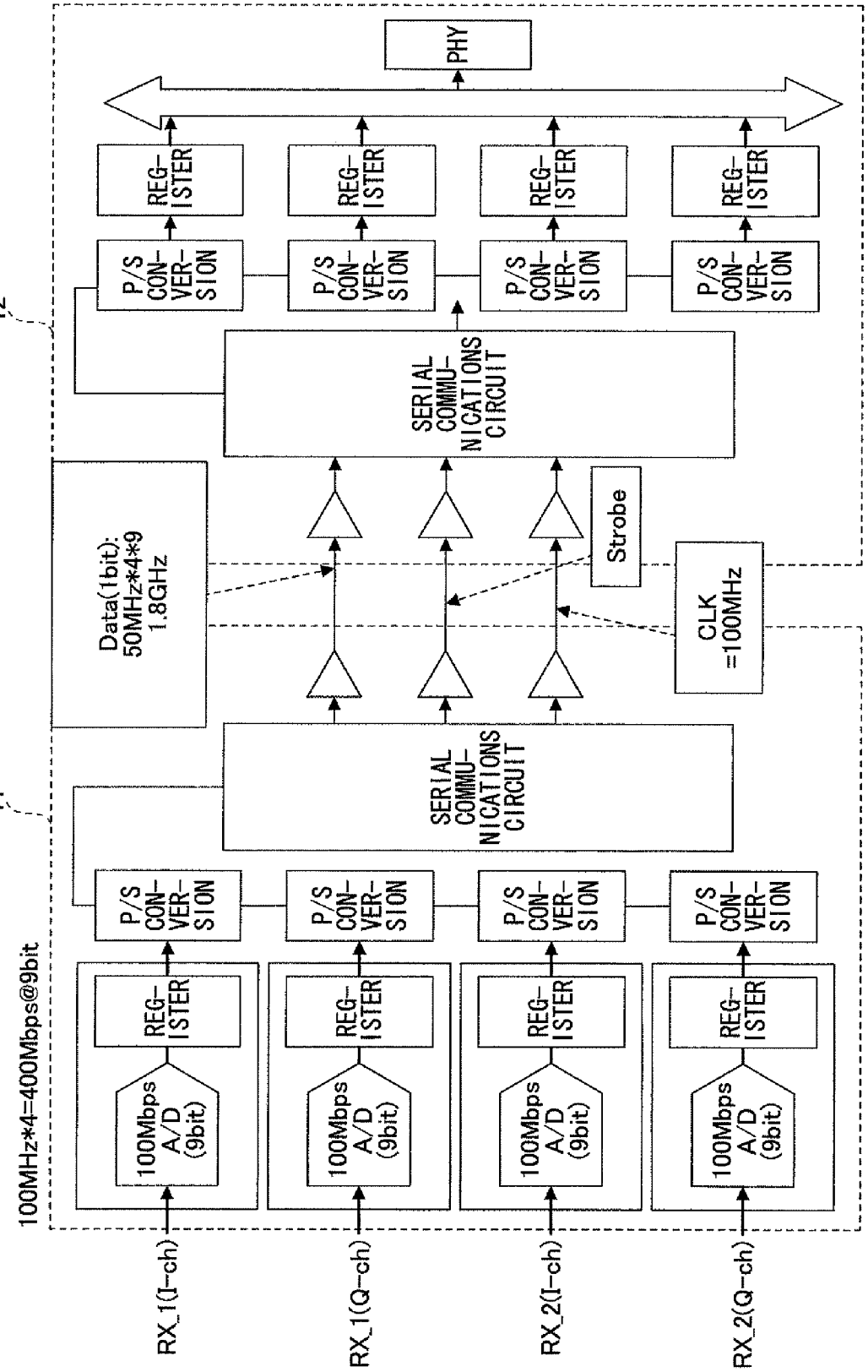

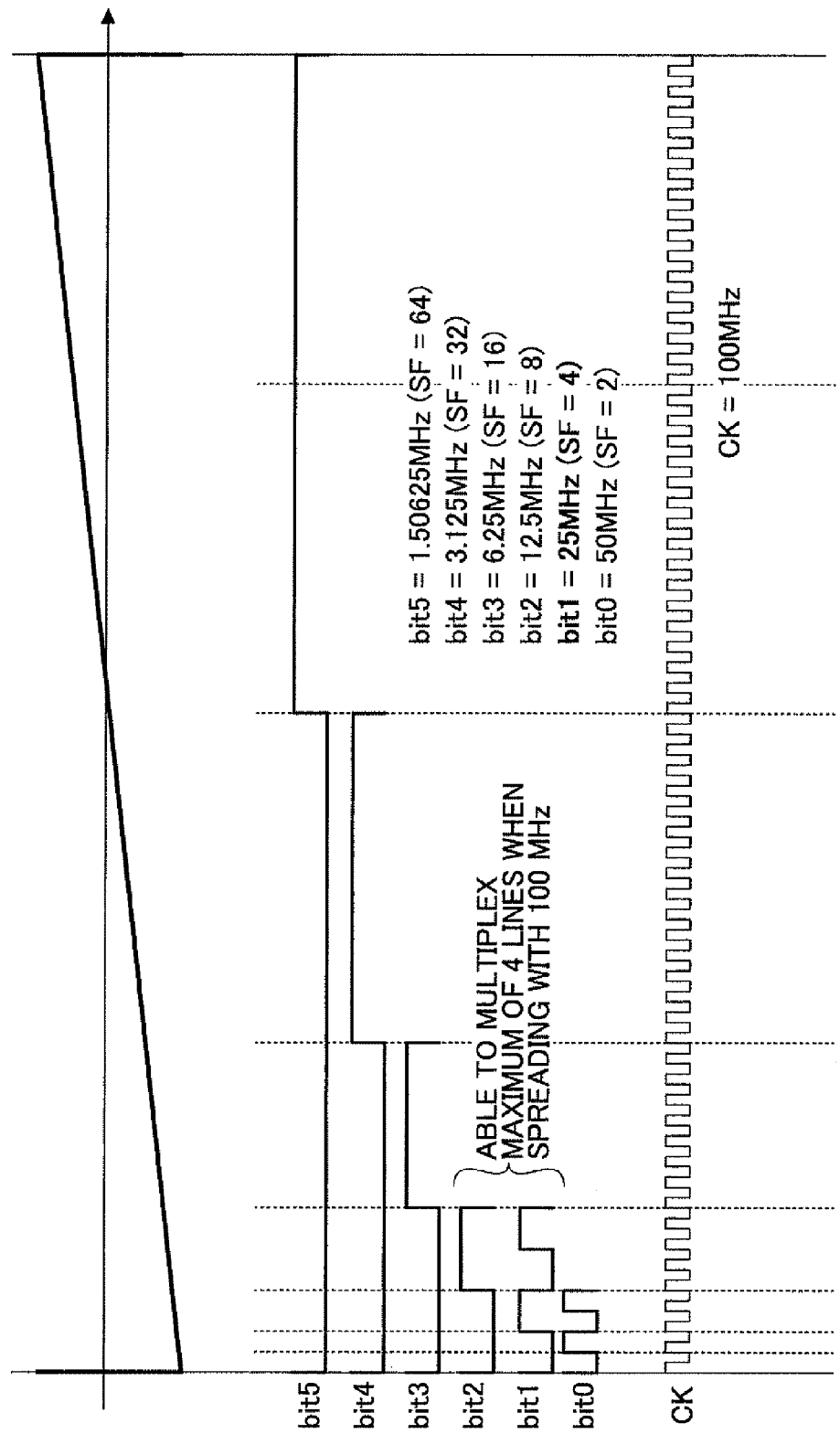

FIG.22A $D_i[35] \longrightarrow D_3[8]$
$D_i[34] \longrightarrow D_2[8]$
$D_i[33] \longrightarrow D_1[8]$
$D_i[32] \longrightarrow D_0[8]$
$D_i[31] \longrightarrow D_3[7]$
$D_i[30] \longrightarrow D_2[7]$
$D_i[29] \longrightarrow D_1[7]$
$D_i[28] \longrightarrow D_0[7]$
$D_i[27] \longrightarrow D_3[6]$
$D_i[26] \longrightarrow D_2[6]$
$D_i[25] \longrightarrow D_1[6]$
$D_i[24] \longrightarrow D_0[6]$
$D_i[23] \longrightarrow D_3[5]$
$D_i[22] \longrightarrow D_2[5]$
$D_i[21] \longrightarrow D_1[5]$
$D_i[20] \longrightarrow D_0[5]$

SIGNAL TRANSMITTING METHOD, TRANSMITTING APPARATUS, AND RECEIVING APPARATUS USED FOR THE SIGNAL TRANSMITTING METHOD

CROSS-REFERENCE TO RELATED APPLICATIONS

The present application is based on Japanese Priority Application No. 2008-068473 filed on Mar. 17, 2008, with the Japanese Patent Office, the entire contents of which are hereby incorporated by reference.

BACKGROUND OF THE INVENTION

1. Field of the Invention

The present invention generally relates to a signal transmitting method, a transmitting apparatus, and a receiving apparatus used for the signal transmitting method.

2. Description of the Related Art

In a case of reducing the number of lines of data communications paths between plural circuits, one known method is to reduce the lines by multiplexing signals in the time direction. The following example describes a case of converting plural analog signals output from a high frequency circuit part of a wireless apparatus into digital signals and transferring the digital signals to a digital circuit part of the wireless apparatus.

In order to achieve high speed transfer, recent wireless apparatuses convert analog signals output from plural antennas or plural reception circuits into digital signals and simultaneously transfer the digital signals to a below-described digital circuit part. However, the number of digital signal lines required by this method of transferring digital signals is equivalent to "number of bits"×"number of A/D converters" (number of channels). Further, along with the increase of the A/D converting rate, the signal frequency flowing in the signal lines is becoming higher year by year. Currently, the maximum signal frequency of the signal lines is approximately 100 MHz. Therefore, the required transmission capability between the A/D conversion circuit and the below-described signal processing circuit can be expressed as (number of bits)×(number of A/D converters)×(sample frequency [bits/second]).

FIGS. 1A and 1B are block diagrams illustrating an example of a signal transfer system according to a related art example. In a high frequency circuit part 11 illustrated in FIGS. 1A and 1B, analog signals of four channels are encoded with a frequency of 100 MHz, converted into digital signals (50 MHz) of 9 bits, and transferred to a digital circuit part 12. In transferring the digital signals to the digital circuit part 12, 9 bits of the digital data may be transferred in parallel or 9 bits of the digital data may be multiplexed and transferred to the digital circuit part 12. In this case, the required transmission capability is 9×4×100=3600 Mbps.

As illustrated in FIG. 1A, in a parallel transfer type signal transfer system where a strobe of 1 bit and a clock of 1 bit (100 MHz) are transferred together by using a signal line of 9 bits, the operation frequency per single signal line is 200 MHz (50 MHz×4).

As illustrated in FIG. 1B, in a serial transfer type signal transfer system where a strobe of 1 bit and a clock of 1 bit (100 MHz) are transferred together by using a signal of 1 bit, the operation frequency per single signal line is 1.8 GHz (50 MHz×4×9). In the case of FIGS. 1A and 1B, the total communications power is 1800×α mW when the power of the buffer amp provided in each signal line is α mW/MHz.

In Japanese Laid-Open Patent Application No. 11-312952, input analog signals are A/D converted and successively stored in a two-system register group. Then, the output of each register group is selectively input to an XOR logic circuit, to thereby calculate the exclusive OR (XOR) between each bit of digital data and spreading codes. Then, the output of the XOR logic circuit is added by an analog adder.

In communications using spreading signals, even in a case where signals spread by using different codes exist in the same communication path, the signals can be separated and decoded by using corresponding spreading signals. In a case of combining the maximum frequency (F) of signals to be transmitted and the number of lines (N) to be multiplexed, the spreading frequency (L) is expressed as L=F×N. In the example illustrated in FIGS. 1A and 1B, since the maximum frequency F is 50 MHz and the number of lines N is 36 (9×4), the spreading frequency L is 1800 MHz (50×36). This results in high power consumption equivalent to 1800×α mW.

SUMMARY OF THE INVENTION

The present invention may provide a signal transmitting method, a transmitting apparatus, and a receiving apparatus used for the signal transmitting method that substantially obviate one or more of the problems caused by the limitations and disadvantages of the related art.

Features and advantages of the present invention will be set forth in the description which follows, and in part will become apparent from the description and the accompanying drawings, or may be learned by practice of the invention according to the teachings provided in the description. Objects as well as other features and advantages of the present invention will be realized and attained by a signal transmitting method, a transmitting apparatus, and a receiving apparatus used for the signal transmitting method particularly pointed out in the specification in such full, clear, concise, and exact terms as to enable a person having ordinary skill in the art to practice the invention.

To achieve these and other advantages and in accordance with the purpose of the invention, as embodied and broadly described herein, an embodiment of the present invention provides a signal transmitting method comprising the steps of: a) categorizing plural digital signals, obtained by performing A/D conversion on plural analog signals consecutively arranged in a time direction, into plural signal groups in an order starting from lower bits of the plural digital signals; b) performing code spreading on the plural digital signals by using a different spread frequency for each signal group and using different spread codes for each bit; c) multiplexing the spread digital signals; and d) transmitting the multiplexed plural digital signals.

Furthermore, another embodiment of the present invention provides a transmitting apparatus including: an A/D converting part configured to perform A/D conversion on plural analog signals consecutively arranged in a time direction; a code spreading part configured to categorize the plural digital signals into plural signal groups in an order starting from lower bits of the plural digital signals and perform code spreading on the plural digital signals by using a different spread frequency for each signal group and using different spread codes for each bit; and a multiplexing part configured to multiplex the spread plural digital signals of each signal group and transmit the multiplexed plural digital signals.

Furthermore, another embodiment of the present invention provides a receiving apparatus for receiving plural multiplexed digital signals, the multiplexed plural digital signals being obtained by categorizing plural digital signals, obtained by performing A/D conversion on plural analog signals consecutively arranged in a time direction, into a plural signal groups in an order starting from lower bits of the plural digital signals, performing code spreading on the plural digital signals by using a different spread frequency for each signal group and using different spread codes for each bit, and multiplexing the spread digital signals, the receiving apparatus including: a despreading part configured to despread the multiplexed plural digital signals for each bit by using different spread codes; and a separating part configured to separate the plural digital signals from the despread multiplexed plural digital signals.

Other objects and further features of the present invention will be apparent from the following detailed description when read in conjunction with the accompanying drawings.

BRIEF DESCRIPTION OF THE DRAWINGS

FIGS. 1A and 1B are block diagrams illustrating a signal transmitting system according to a related art example;

FIG. 2 is a schematic diagram illustrating a manner in which ramp waveforms are subject to A/D conversion;

FIGS. 22A and 22B are schematic diagrams for describing a function of a DMUX circuit according to an embodiment of the present invention.

DESCRIPTION OF THE PREFERRED EMBODIMENTS

Figure 3:
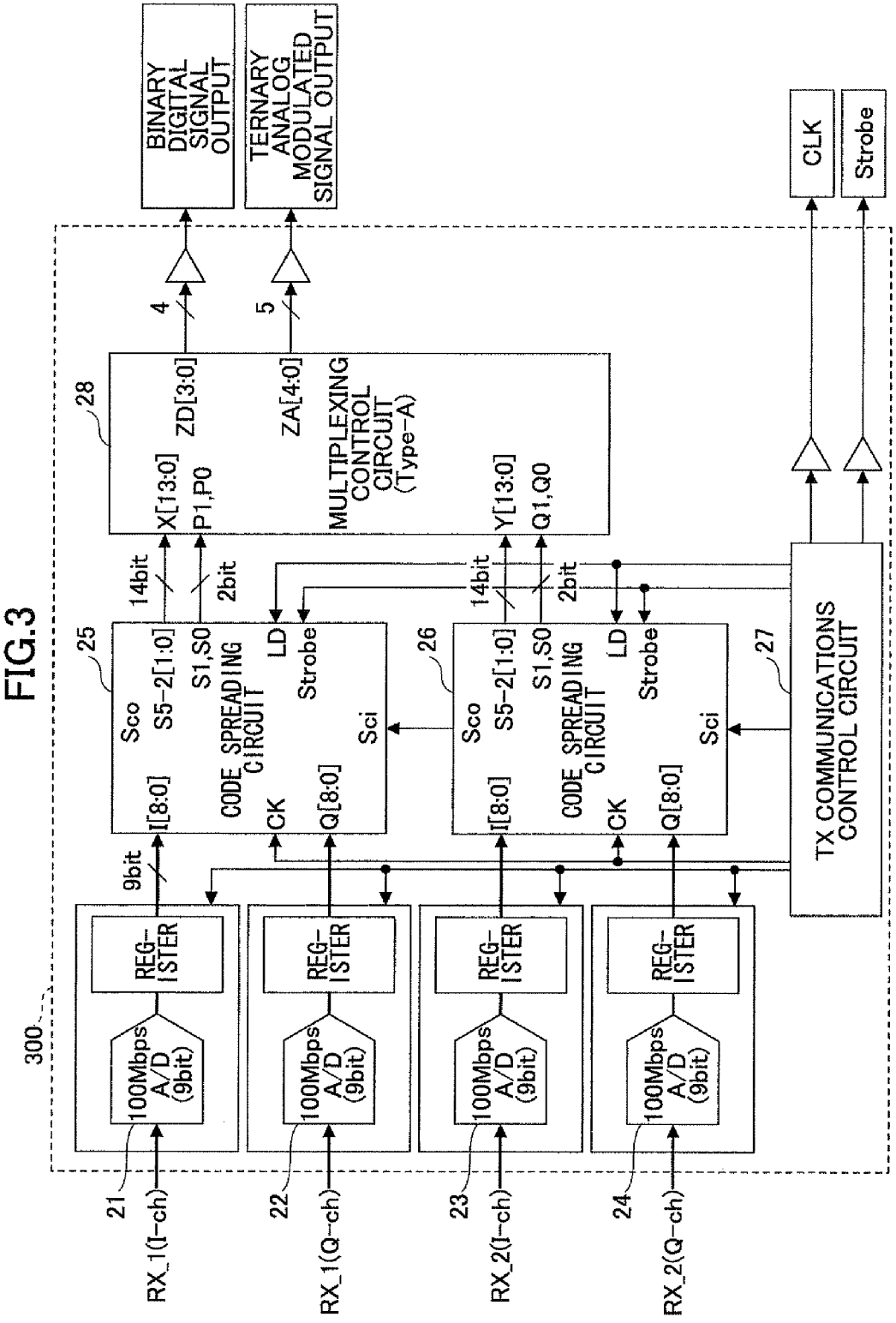
FIG. 3 is a block diagram illustrating a transmitting apparatus to which an embodiment of the present invention is applied.

In the following, embodiments of the present invention are described with reference to the accompanying drawings.

Spread spectrum (code spreading) is a technology utilizing signals that are spread (calculated by an exclusive OR operation) by using a code string (scramble code) obtained from a frequency (chip rate) of SF (Spreading Factor) times with respect to a sampling frequency (symbol rate) of a transmitting signal. Thereby, a maximum of SF different signals are multiplexed and transmitted in a same signal bandwidth. By de-spreading the transmitted signals with the code string used in transmitting the signals, the original signals can be separated from each other.

However, with the spread spectrum technology, in order to spread N (where N is an integer no less than 2) lines of signals by using N independent codes and combining the lines into a single line, the spread frequency becomes a frequency of N times. The use of such a spread frequency causes the total power to increase in proportion with the product of the number of lines of signals and frequency.

In general, signals output from an antenna or in a receiving circuit (i.e. A/D converted signals) are successive toward the direction of time. In a case of performing A/D conversion on signals successively output in the time direction, the frequency of the upper bits (digits) during A/D conversion becomes lower compared to the frequency of the lower bits (digits) as illustrated in FIG. 2. FIG. 2 illustrates a manner in which a top-most ramp waveform is A/D converted where frequency and SF (spectrum factor) are indicated in bit units.

Accordingly, the least significant bit (LSB) of the converted digital value is generated maintaining the aforementioned successive property and changes at a frequency nearest to a sample signal. On the other hand, the most significant bit (MSB) of the converted digital value exhibits a property that changes at a most delayed frequency with respect to the sample signal.

In other words, as the digital value moves from the LSB toward the MSB in a case where the sample frequency is the chip rate used in the spreading process, the cycle in which the bit changes becomes slower in an inverse proportion to multiples of 2 (2-squared). The proportion of the frequency of spread signals with respect to the sample frequency (apparent maximum spectrum factor) increases.

By utilizing the property in which the frequency of the upper bits becomes lower with respect to the frequency of the lower bits, the spread frequency of the upper bits can be made lower than the spread frequency of the lower bits when performing the code spreading/multiplexing process. Thereby, power consumption can be reduced compared to that of a simple spreading process.

For example, 36 (9 bits×4) signal lines are categorized (divided) into four groups of multiples of 2 (2-squared) lines (2 lines, 4 lines, 8 lines, 16 lines) in an order starting from the lower bits where 4 lines of the least significant bits (LSB) of each A/D converter are not included. Further, the signal lines of each group are spread by using a different spread frequency. That is, each signal of the 32 lines (4 lines of the least significant bits (LSB) of each A/D converter not included) are applied with a different spreading code.

<Transmitting Apparatus>

Figure 4:
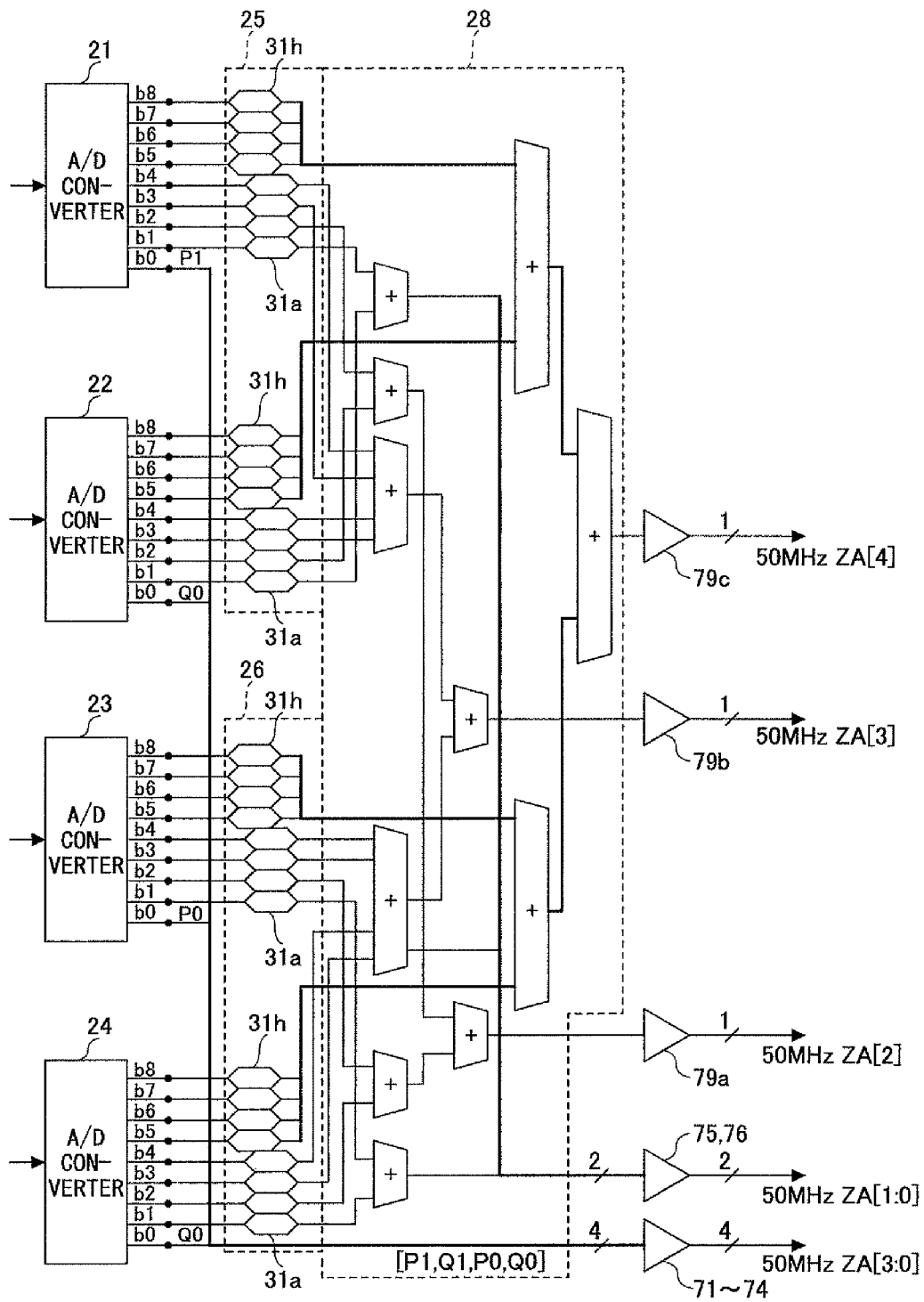
FIG. 4 is a schematic diagram illustrating a manner in which signals of FIG. 3 are combined.

FIG. 3 is a block diagram illustrating a transmitting apparatus 300 according to an embodiment of the present invention. FIG. 4 is a schematic diagram illustrating a manner in which the symbols of FIG. 3 are combined. In FIGS. 3 and 4, the transmitting apparatus 300 corresponds to, for example, a high frequency circuit part including A/D converters 21, 22, 23, 24, code spreading circuits 25, 26, a TX communications control circuit 27, and a multiplexing control circuit 28.

The A/D converters 21, 22, 23, and 24 use 100 MHz clocks supplied from the TX communications control circuit 27 to convert analog reception signals of four channels into nine bit digital signals, respectively.

The digital signals, which are output from each of the A/D converters 21, 22, are supplied to the code spreading circuit 25. The digital signals, which are output from each of the A/D converters 23, 24, are supplied to the code spreading circuit 26. The code spreading circuits 25, 26 receive the digital signals according to clocks of 900 MHz supplied from the TX communications control circuit 27 and perform code spreading on the digital signals according to initial spreading codes supplied from the TX communications control circuit 27.

The multiplexing control circuit 28 multiplexes the spread signals output from the code spreading circuits 25, 26 and transfers an analog modulation signal ZA [4:0] together with a digital signal ZD [3:0] (digital signal of lowest bit that is not spread) to a below-described receiving apparatus 310 by wire (in this embodiment, four lines). Along with transferring the analog modulation signal and digital signal from the multiplexing control circuit 28, the TX communications control circuit 27 transfers a strobe signal (50 MHz) of a symbol rate and a clock (100 MHz) to the receiving apparatus 310 by wire (in this embodiment, five lines).

Figure 5:
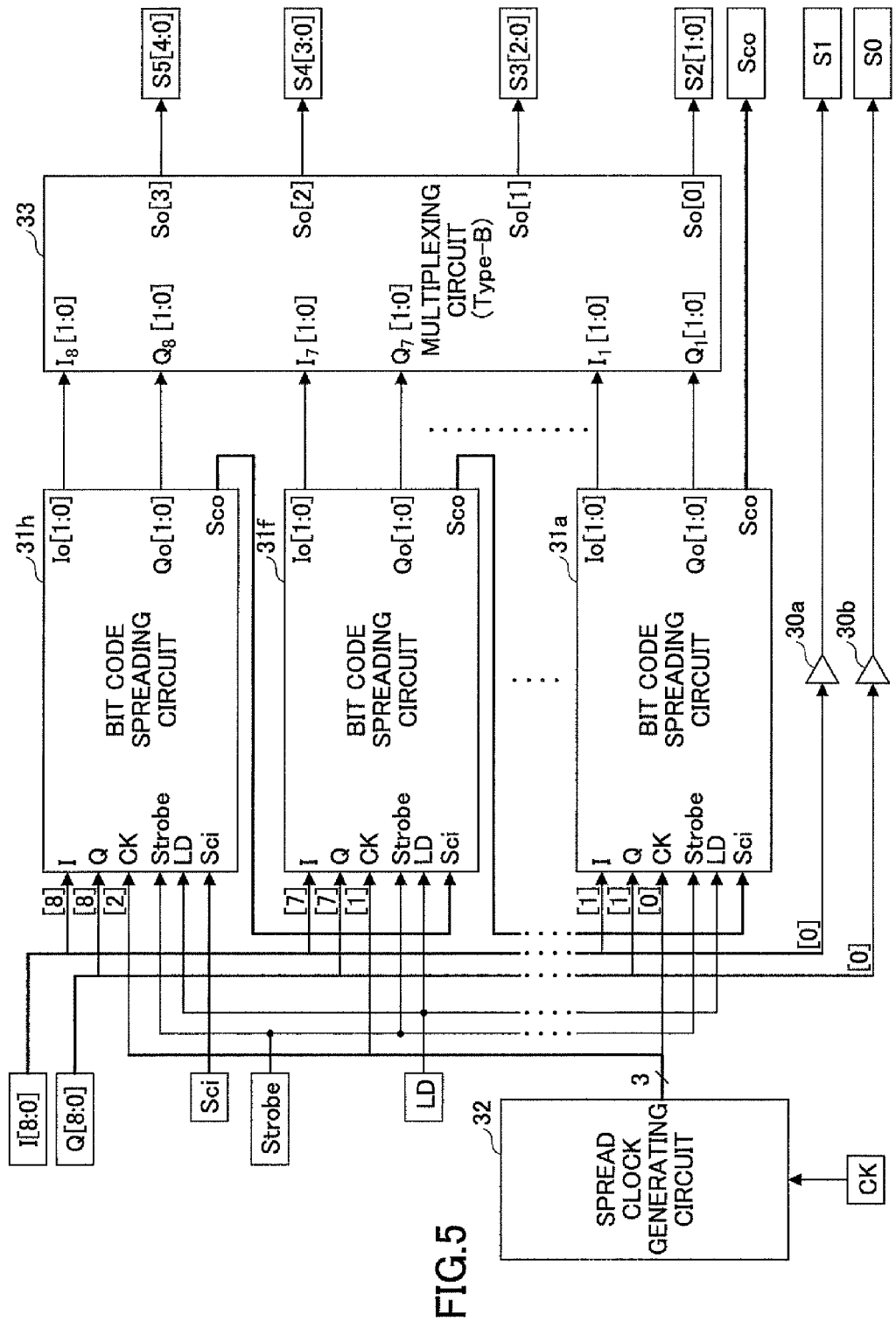
FIG. 5 is a block diagram illustrating a code spreading circuit according to an embodiment of the present invention.

FIG. 5 is a block diagram illustrating the code spreading circuits 25, 26 according to an embodiment of the present invention. In FIG. 5, digital signals of 9 bits are supplied from the A/D converter 21 (or 23) to a terminal I [8:0]. The terminal I outputs the highest bit [0] of the digital signals to a terminal S1 via a buffer 30a and supplies the second through ninth bits of the digital signals to corresponding terminals I of a bit code spreading circuit(s) 31 (in this embodiment, bit code spreading circuits 31a through 31h) in bit units.

Further, digital signals of 9 bits are supplied from the A/D converter 22 (or 24) to a terminal Q [8:0]. The terminal Q [8:0] outputs the highest bit of the digital signals to a terminal S0 via a buffer 30b and outputs the second through ninth bits of the digital signals to corresponding terminals Q of bit code spreading circuits 31a through 31h in bit units.

Further, the initial value of the spreading code is supplied from the TX communications control circuit 27 to a terminal Sci. The initial value of the spreading code is output from the terminal Sci to the bit code spreading circuit 31h, supplied from the bit code spreading circuit 31h through the bit code spreading circuit 31a in this order, and output from the bit code spreading circuit 31a to a terminal Sco. A strobe signal from the TX communications control circuit 27 is input to a terminal Strobe and output to bit code spreading circuits 31a through 31h from the terminal Strobe. Likewise, a load signal from the TX communications control circuit 27 is input to a terminal LD and output to the bit code spreading circuits 31a through 31h from the terminal LD.

Each of the bit code spreading circuits 31a through 31h spreads (diffuses) two bits of signals supplied from the terminals I and Q and supplies the spread signals to a multiplexing circuit 33. The multiplexing circuit 33 multiplexes spread signals supplied from the bit code spreading circuits 31a through 31h and outputs the multiplexed signals to terminals S2 [1:0], S3 [2:0], S4 [3:0], and S5 [4:0], respectively.

Figure 6:
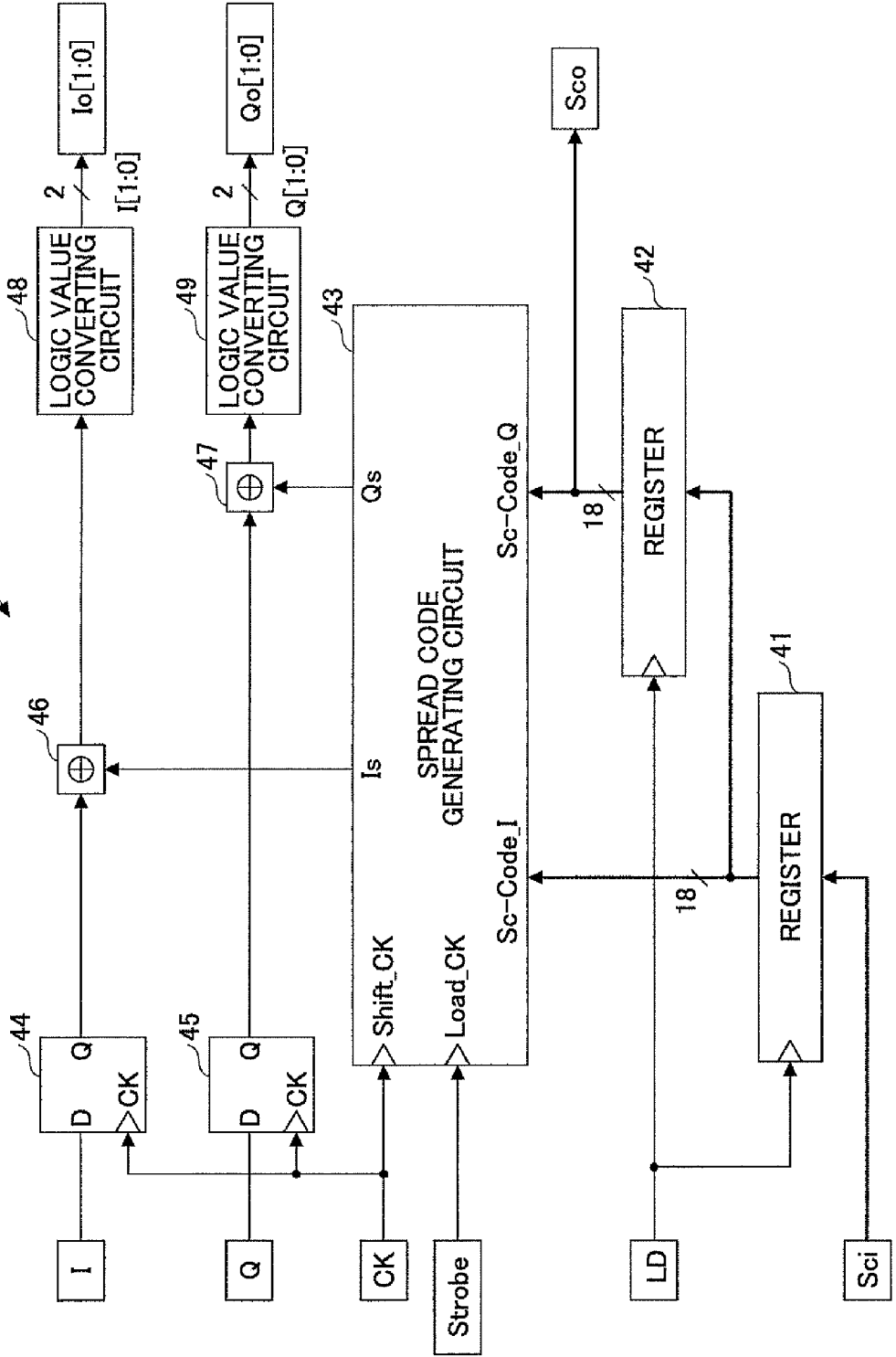
FIG. 6 is a block diagram illustrating a bit code spreading circuit according to an embodiment of the present invention.

FIG. 6 is a block diagram illustrating the bit code spreading circuit 31 according to an embodiment of the present invention. The initial value of the spreading code supplied from the terminal Sci is latched to each one of registers 41, 42 according to a load signal supplied from the terminal LD and supplied to a spread code generating circuit 43 from the registers 41, 42. The initial value of the spreading code is input to the spread code generating circuit 43 according to a strobe signal supplied from the terminal Strobe.

The spread code generating circuit 43 generates two different kinds of spreading codes according to a shift clock supplied from a terminal CK and supplies the spreading codes to exclusive OR circuits 46, 47, respectively. Digital signals of 1 bit are supplied to each of the terminals I and Q and supplied to the exclusive OR circuits 46, 47 from latch circuits 44, 45, respectively, in synchronization with a shift clock supplied from a terminal CK.

The exclusive OR circuits 46, 47 spreads (diffuses) the corresponding digital signals of 1 bit by using the two different kinds of spreading codes. Logical value converting circuits 48, 49 convert the corresponding spread signals into two bits of signals that are complements of 2 (2's complement) I [1:0], Q [1:0] and output the converted signals to terminals $I_0$ [1:0] and $Q_0$ [1:0]. The spread signals are converted to 2's complements so that the spread signals can be added in digital form in a subsequent step.

Figure 7:
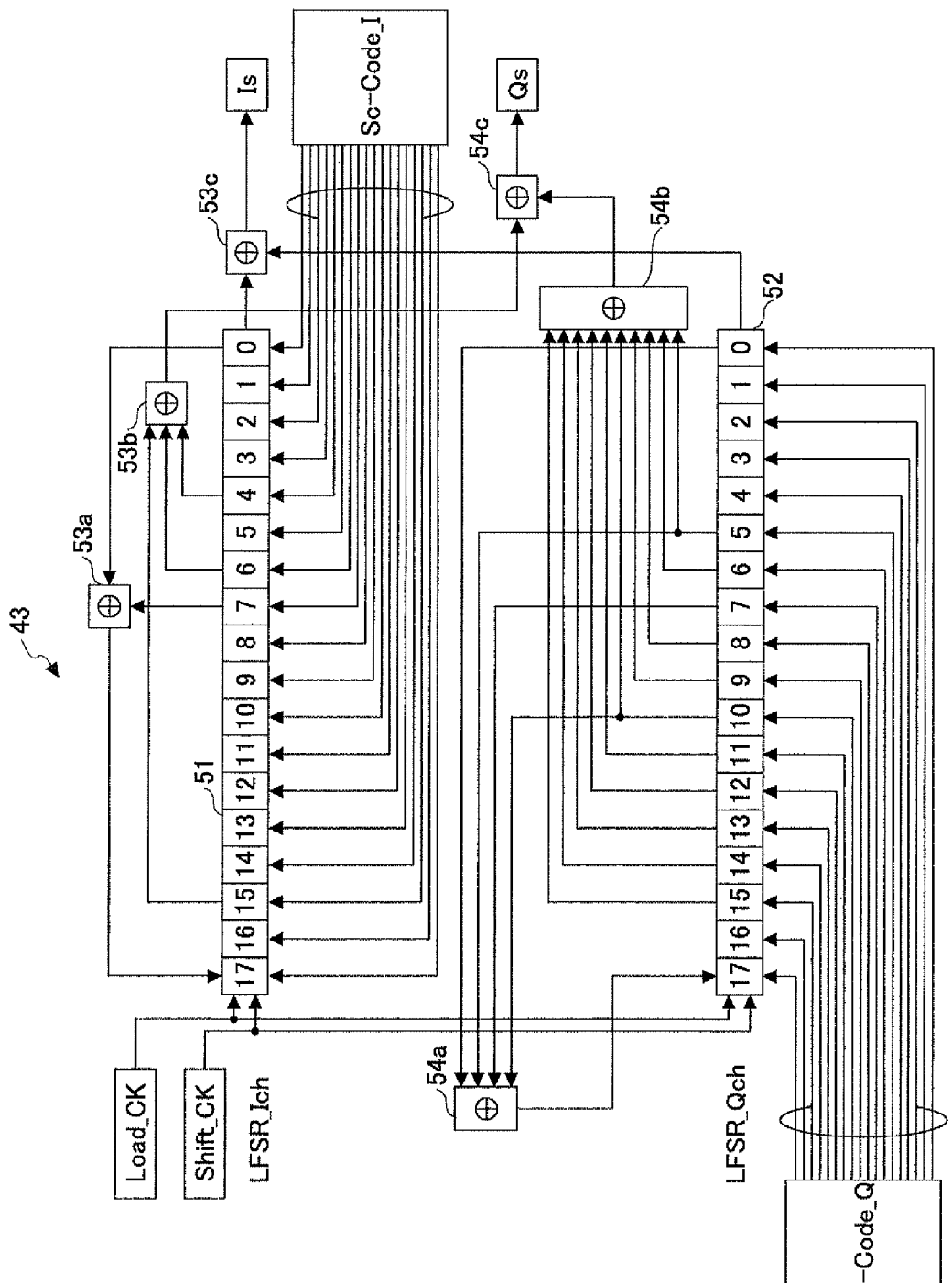
FIG. 7 is a schematic diagram illustrating a spread code generating circuit according to an embodiment of the present invention.

As illustrated in FIG. 7, the spread code generating circuit 43 according to an embodiment of the present invention includes linear feedback shift registers 51, 52 having feedback taps and exclusive OR circuits 53a, 53b, 53c, 54a, 54b, and 54c.

Figure 8:
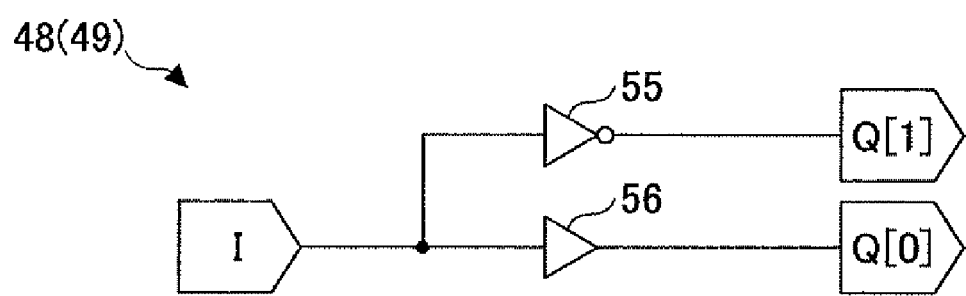
FIG. 8 is a schematic diagram illustrating a logic value converting circuit according to an embodiment of the present invention.

As illustrated in FIG. 8, the logical value converting circuits 48, 49 include an inverter 55 and a buffer 56.

Figure 9:
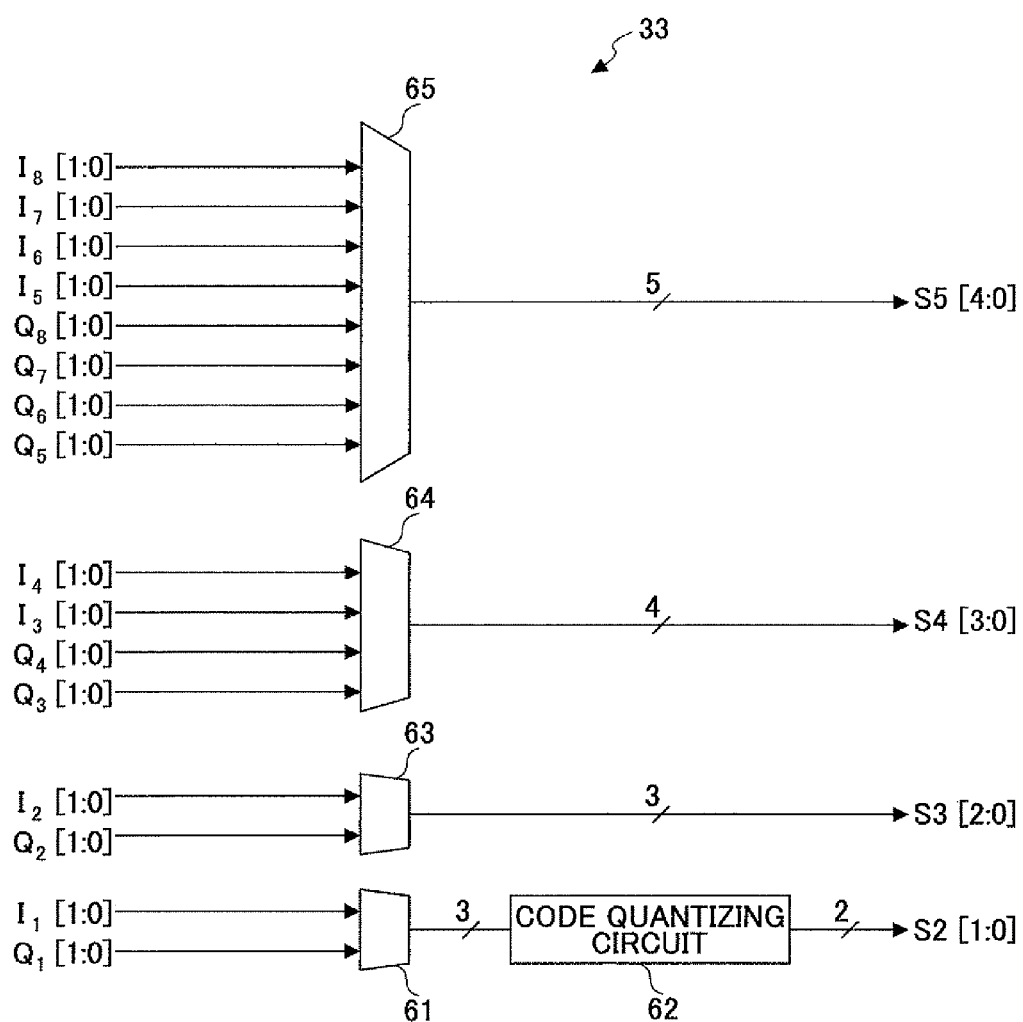
FIG. 9 is a block diagram illustrating a multiplexing circuit according to an embodiment of the present invention.

FIG. 9 is a block diagram illustrating the multiplexing circuit 33 according to an embodiment of the present invention. In FIG. 9 a signed two-input digital adding circuit 61 adds the signals $I_1$ [1:0], $Q_1$ [1:0] from the bit code spreading circuit 31a and supplies an added signal of 3 bits to a code quantizing circuit 62. The code quantizing circuit 62 converts the 3-bit added signal into a signal S2 [1:0] of 2 bits and outputs the 2-bit signal S2 [1:0]. Another signed two-input digital adding circuit 63 adds the signals $I_2$ [1:0], $Q_2$ [1:0] from the bit code spreading circuit 31b and outputs an added signal S3 [2:0] of 3 bits.

A signed four-input digital adding circuit 64 adds the signals $I_3$ [1:0], $I_4$ [1:0], $Q_3$ [1:0], $Q_4$ [1:0] from the bit code spreading circuits 31c, 31d and outputs an added signal S4 [3:0] of 4 bits. A signed eight-input digital adding circuit 65 adds the signals $I_5$ [1:0] through $I_8$ [1:0] and $Q_5$ [1:0] through $Q_8$ [1:0] from the bit code spreading circuits 31e, 31f, 31g, 31h and outputs an added signal S5 [4:0] of 5 bits.

Figure 10:
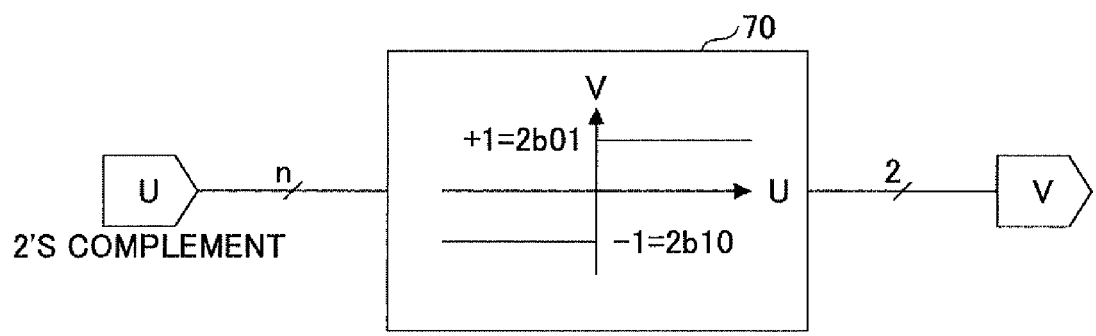
FIG. 10 is a schematic diagram illustrating a code quantizing circuit according to an embodiment of the present invention.

FIG. 10 illustrates a code quantizing circuit 70 according to an embodiment of the present invention. In FIG. 10, two's complement signals of n bits are compared with a threshold V and converted into signed two-bit signals representing +1 or −1 by the code quantizing circuit 70. In other words, the code quantizing circuit performs degeneration on the signals.

Figure 11:
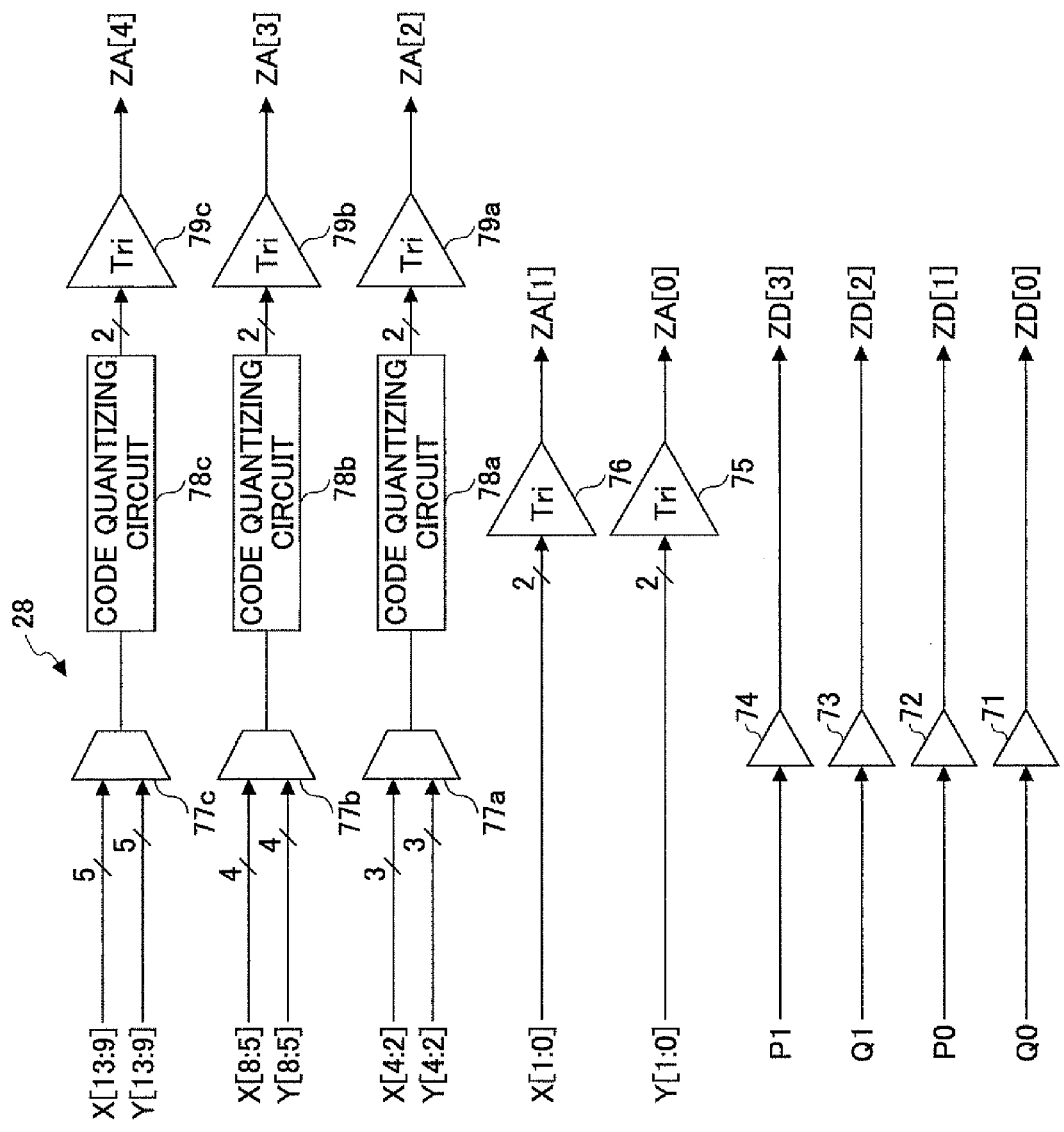
FIG. 11 is a block diagram illustrating a multiplexing control circuit according to an embodiment of the present invention.

FIG. 11 is a block diagram illustrating the multiplexing control circuit 28 according to an embodiment of the present invention. In FIG. 11, the signal Q0 output from the terminal S0 of the code spreading circuit 26 is input to a buffer 71 and is output as a digital signal ZD [0] from the buffer 71. Further, the signal P0 output from the terminal S0 of the code spreading circuit 25 is input to a buffer 72 and output as a digital signal ZD [1] from the buffer 72. Further, the signal Q1 output from the terminal S1 of the code spreading circuit 26 is input to a buffer 73 and output as a digital signal ZD [2] from the buffer 73. Further, the signal P1 output from the terminal S1 of the code spreading circuit 25 is input to a buffer 74 and output as a digital signal ZD [3] from the buffer 74.

An analog ternary conversion circuit 75 converts the signal Y [1:0] output from the terminal S2 [1:0] of the code spreading circuit 26 into an analog ternary signal of 1 bit and outputs the analog ternary signal as an analog modulation signal ZA [0]. Another analog ternary conversion circuit 76 converts the signal X [1:0] output from the terminal S2 [1:0] of the code spreading circuit 25 into an analog ternary signal and outputs the analog ternary signal as an analog modulation signal ZA [1].

The signal X [4:2] output from the terminal S3 [2:0] of the code spreading circuit 25 and the signal Y [4:2] output from the terminal S3 [2:0] of the code spreading circuit 26 are added by a signed two-input digital adding circuit 77a. The added signal is supplied from the signed two-input digital adding circuit 77a to a code quantizing circuit 78a. The code quantizing circuit 78a converts the supplied signal into a signal of 2 bits. The two-bit signal is converted into an analog ternary signal of 1 bit by an analog ternary conversion circuit 79a and output as an analog modulation signal ZA [2] from the analog ternary conversion circuit 79a.

The signal X [8:5] output from the terminal S4 [3:0] of the code spreading circuit 25 and the signal Y [8:5] output from the terminal S4 [3:0] of the code spreading circuit 26 are added by a signed two-input digital adding circuit 77b. The added signal is supplied from the signed two-input digital adding circuit 77b to a signed quantizing circuit 78b. The signed quantizing circuit 78b converts the supplied signal into a signal of 2 bits. The two-bit signal is converted into an analog ternary signal of 1 bit by an analog ternary conversion circuit 79b and output as an analog modulation signal ZA [3] from the analog ternary conversion circuit 79b.

The signal X [13:9] output from the terminal S5 [4:0] of the code spreading circuit 25 and the signal Y [13:9] output from the terminal S5 [4:0] of the code spreading circuit 26 are added by a signed two-input digital adding circuit 77c. The added signal is supplied from the signed two-input digital adding circuit 77c to a signed quantizing circuit 78c. The signed quantizing circuit 78c converts the supplied signal into a signal of 2 bits. The two-bit signal is converted into an analog ternary signal of 1 bit by an analog ternary conversion circuit 79c and output as an analog modulation signal ZA [4] from the analog ternary conversion circuit 79c.

Figure 12:
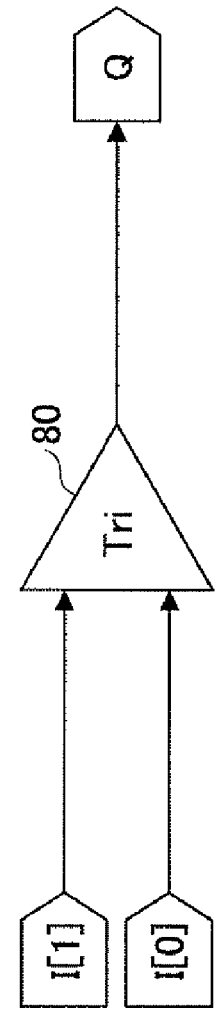
FIG. 12 is a schematic diagram illustrating an analog ternary converting circuit according to an embodiment of the present invention.

FIG. 12 is a schematic diagram illustrating an exemplary analog ternary conversion circuit 80 used as the analog ternary conversion circuit 75, 76, 79a-79c according to an embodiment of the present invention. As illustrated in FIG. 12, the analog ternary conversion circuit 80 outputs a ternary analog modulation signal indicating +VDD, −VDD, or high impedance (Hi-Z) according to input two-bit signals I [1], I [0].

In this embodiment, the transmitting apparatus 300 illustrated in FIG. 3 outputs the digital signals ZD [3:0] with four lines and the analog modulation signals ZA [5:0] with five lines from the multiplexing control circuit 28.

<Receiving Apparatus>

Figure 13:
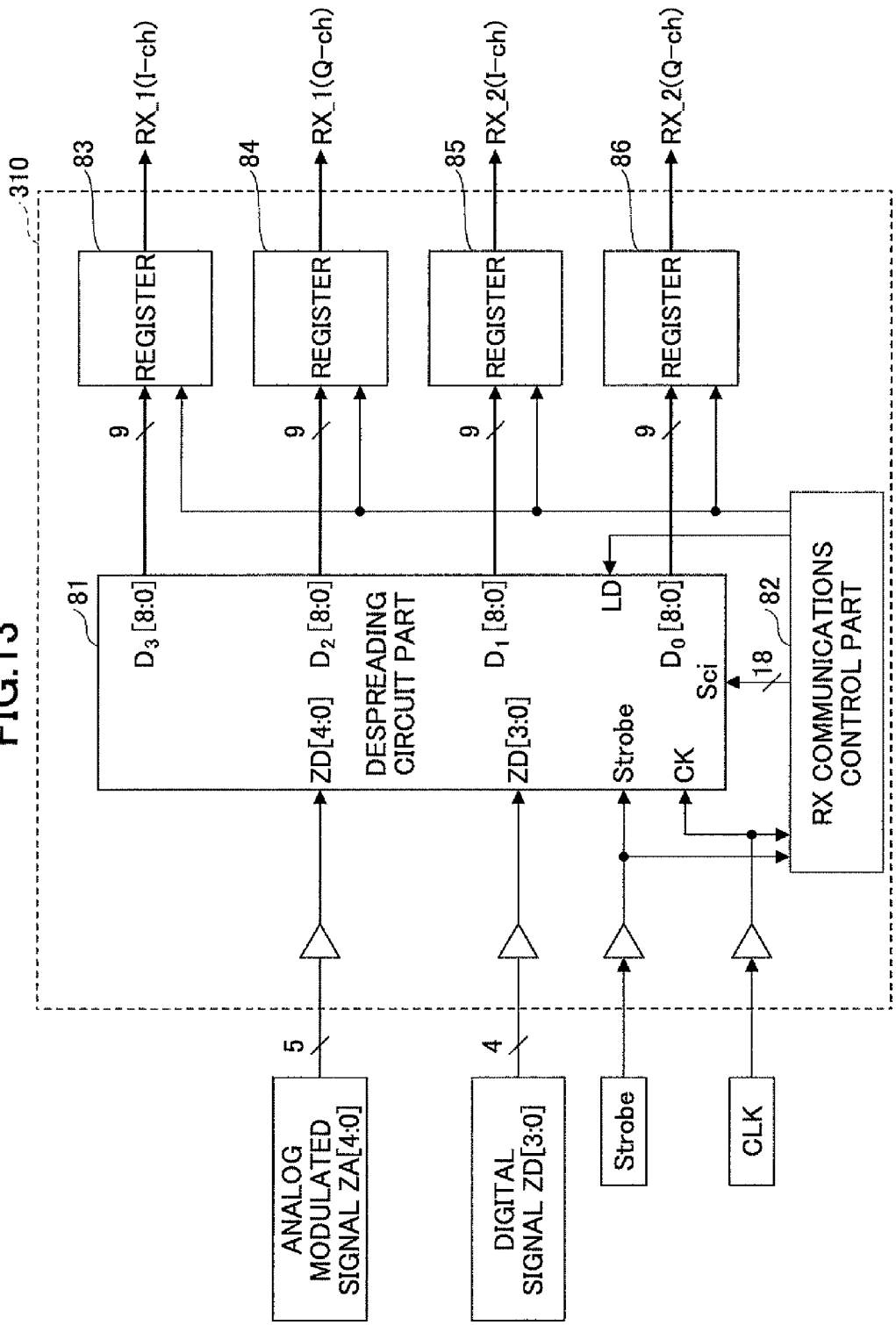
FIG. 13 is a block diagram illustrating a receiving apparatus to which an embodiment of the present invention is applied.

FIG. 13 is a block diagram illustrating an embodiment of the receiving apparatus 310 to which the present invention is applied. In FIG. 13, the receiving apparatus 310 corresponds to, for example, a digital circuit part including a despreading circuit 81, an RX communications control circuit 82, and registers 83, 84, 85, 86.

The RX communications control circuit 82 according to an embodiment of the present invention generates an initial spread code and store signal synchronizing with the 100 MHz clock and strobe signals transferred from the transmitting circuit 300 by wire.

The despreading circuit 81 receives four lines of digital signals ZD [3:0], five lines of analog modulated signals ZA [5:0], and 100 MHZ clock and strobe signals transferred from the transmitting apparatus 300 by wire. Accordingly, the despreading circuit 81 performs despreading on the analog modulated signals according to the initial spread code synchronizing with the clock and strobe signals supplied from the RX communications control circuit 82 and outputs four lines of digital signals where each of the digital signals is 9 bits. The four lines of digital signals are latched to corresponding registers 83 through 86 according to the store signals supplied from the RX communications control circuit 82 and then output from the receiving apparatus 310. Alternatively, D/A converters may be used as the registers 83 through 86.

Figure 14:
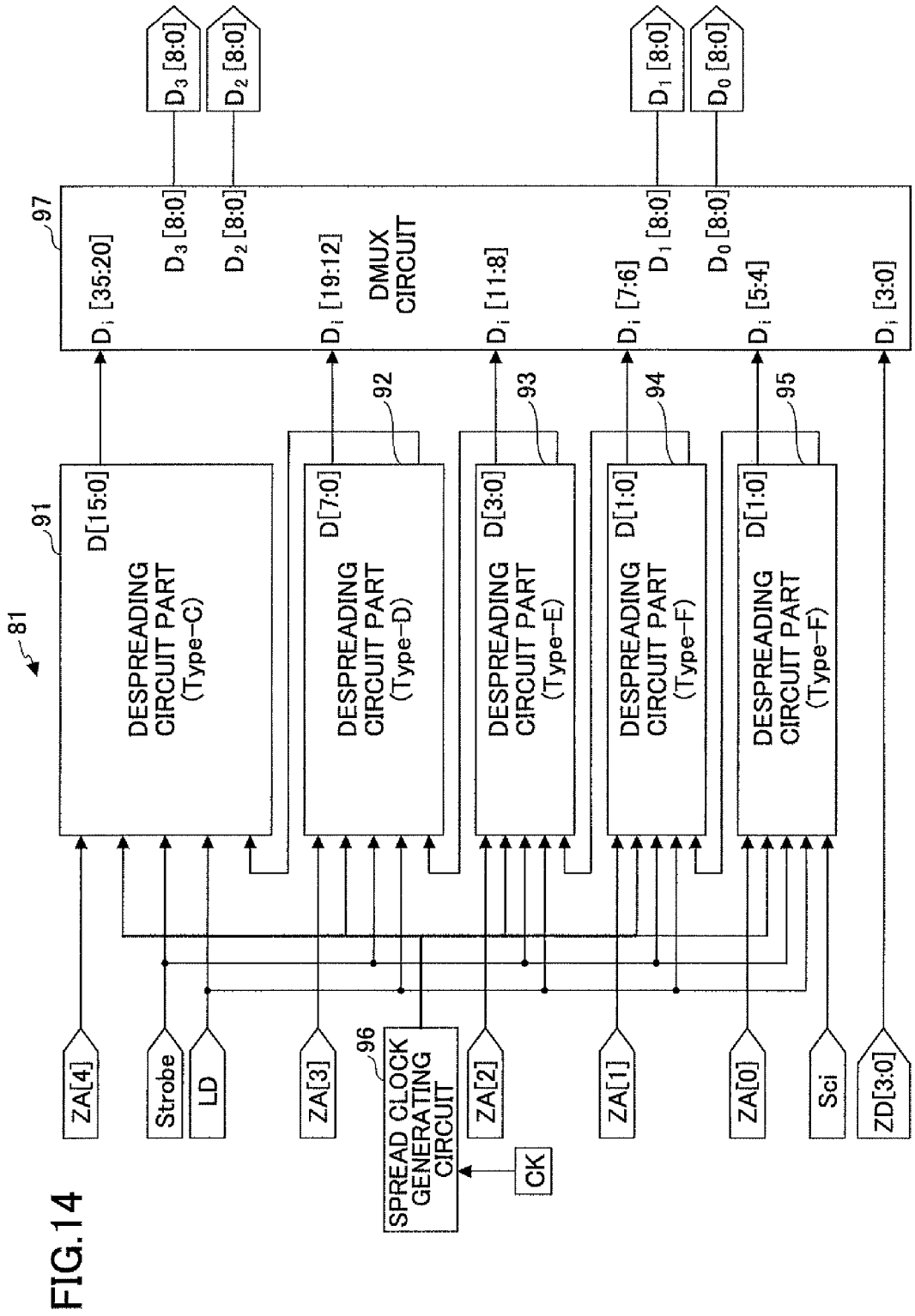
FIG. 14 is a block diagram illustrating a despreading circuit according to an embodiment of the present invention.

FIG. 14 is a block diagram illustrating the despreading circuit 81 according to an embodiment of the present invention. In FIG. 14, the despreading circuit 81 includes a C-type despreading circuit part 91, a D-type despreading circuit part 92, an E-type despreading circuit part 93, F-type despreading circuit parts 94, 95, a spread clock generating circuit 96, and a DMUX circuit 97.

The analog modulated signal ZA [4] is supplied to the despreading circuit part 91. The analog modulated signal ZA [3] is supplied to the despreading circuit part 92. The analog modulated signal ZA [2] is supplied to the despreading circuit part 93. The analog modulated signal ZA [1] is supplied to the despreading circuit part 94. The analog modulated signal ZA [0] is supplied to the despreading circuit part 95. The digital signal ZD [3:0] is supplied to the DMUX circuit 97.

A strobe signal is input to a terminal Strobe of the despreading circuit 81 and supplied to the despreading circuit parts 91 through 95. A clock signal is input to the spread clock generating circuit 96, to thereby generate a spread clock. The generated spread clock is supplied to the despreading circuit parts 91 through 95. A load signal and an initial spread code from the RX communications control circuit 82 are supplied to corresponding terminals LD, Sci.

The data D [15:0], D [7:0], D [3:0], D [1:0], D [1:0] despread by corresponding despreading circuit parts 91 through 95 are supplied to the DMUX circuit 97. The DMUX circuit 97 rearranges the order of the data D [15:0], D [7:0], D [3:0], D [1:0], D [1:0] and the digital signals ZD [3:0] and outputs data $D_0$ [8:0], $D_1$ [8:0], $D_2$ [8:0], and $D_3$ [8:0].

Figure 15:
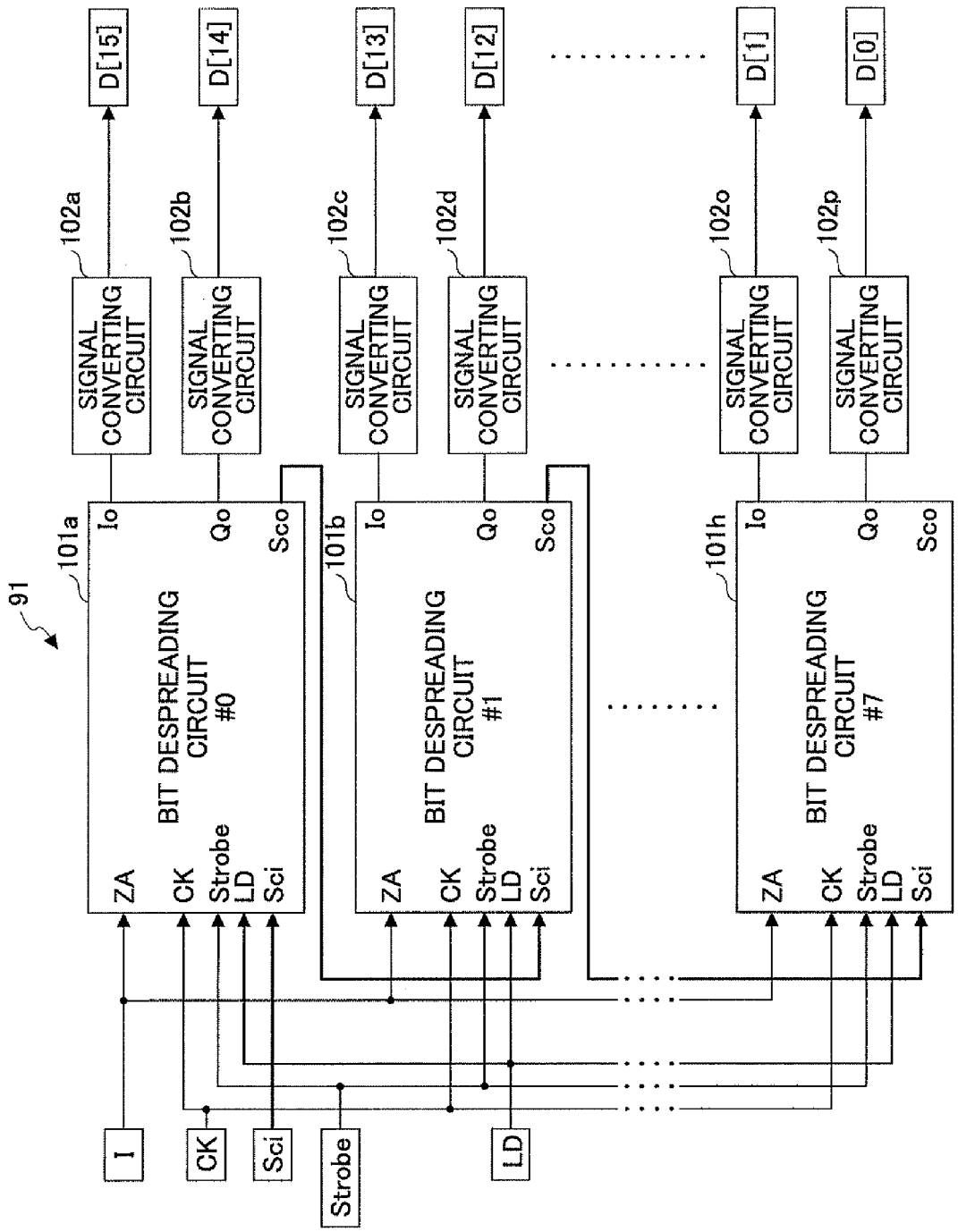
FIG. 15 is a block diagram illustrating a C-type despreading circuit part according to an embodiment of the present invention.

FIG. 15 is a block diagram illustrating the C-type despreading circuit part 91 according to an embodiment of the present invention. In FIG. 15, the despreading circuit part 91 includes a bit despreading circuit(s) 101 (in this embodiment, bit despreading circuits 101a through 101h) to which corresponding analog modulated signals ZA [4] are supplied from its terminal I. Further, a strobe signal from its terminal Strobe, a load signal from its terminal LD, and a clock from its terminal CK are also supplied to the bit despreading circuits 101a through 101h. Further, initial spread codes from its terminal Sci are supplied to the bit despreading circuits 101a through 101h in order.

Each of the bit despreading circuits 101a through 101h performs despreading on the analog modulated signals input to its terminal ZA and outputs bits $I_0$, $Q_0$. The bits $I_0$, $Q_0$ output from the bit despreading circuits 101a through 101h are converted into digital signals in corresponding signal converting circuits 101a through 101h and output as bits D [15] through D [0].

Figure 16:
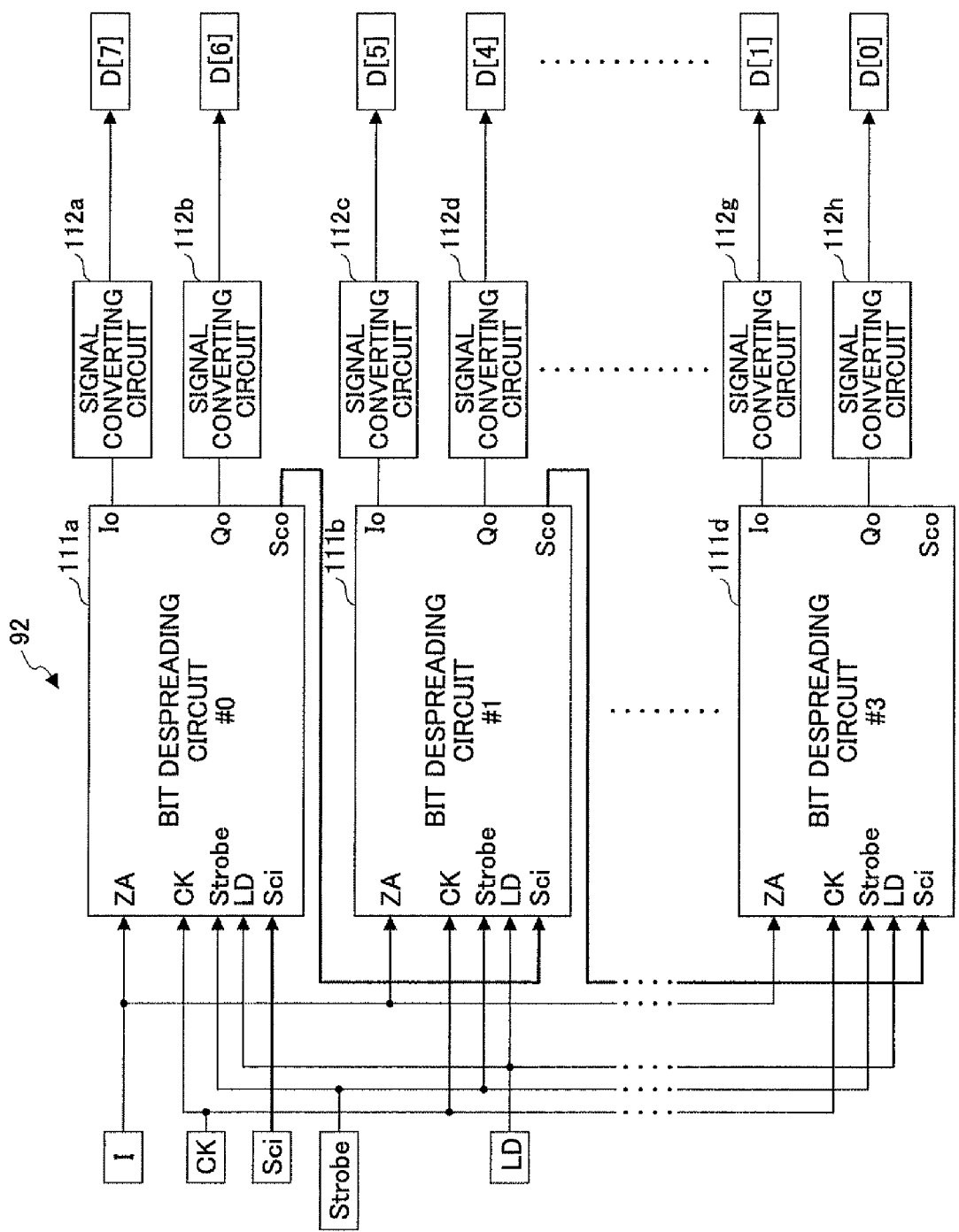
FIG. 16 is a block diagram illustrating a D-type despreading circuit part according to an embodiment of the present invention.

FIG. 16 is a block diagram illustrating the D-type despreading circuit 92 according to an embodiment of the present invention. In FIG. 16, the despreading circuit part 92 includes a bit despreading circuit(s) 111 (in this embodiment, bit despreading circuits 111a through 111d) to which corresponding analog modulated signals ZA [3] are supplied from its terminal I. Further, a strobe signal from its terminal Strobe, a load signal from its terminal LD, and a clock from its terminal CK are also supplied to the bit despreading circuits 111a through 111d. Further, initial spread codes from its terminal Sci are supplied to the bit despreading circuits 111a through 111d in order.

Each of the bit despreading circuits 111a through 111d perform despreading on the analog modulated signals input to its terminal ZA and outputs bits $I_0$, $Q_0$. The bits $I_0$, $Q_0$ output from the bit despreading circuits 111a through 111d are converted into digital signals in corresponding signal converting circuits 111a through 111d and output as bits D [7] through D [0].

Figure 17:
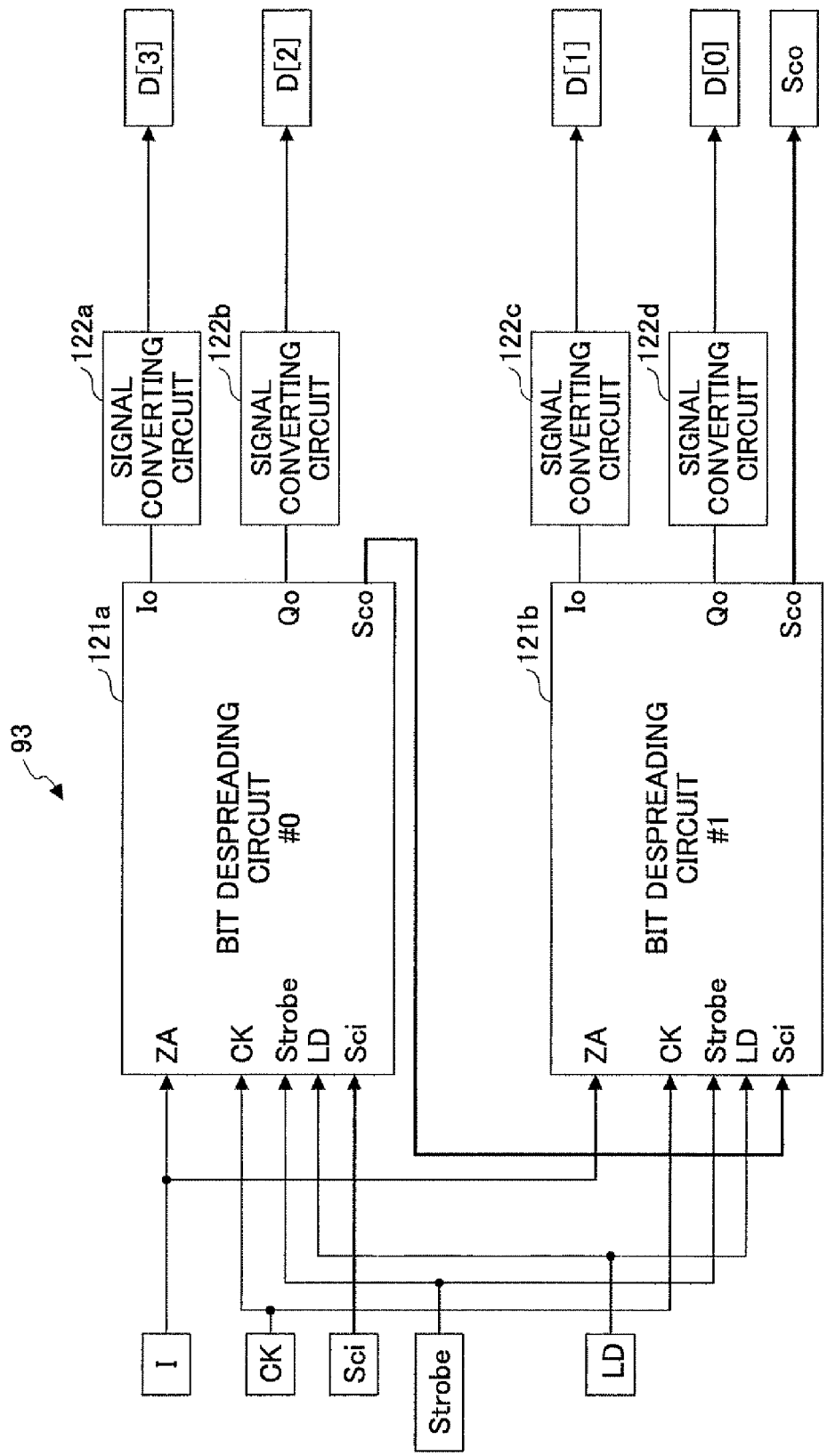
FIG. 17 is a block diagram illustrating an E-type despreading circuit part according to an embodiment of the present invention.

FIG. 17 is a block diagram illustrating the E-type despreading circuit 93 according to an embodiment of the present invention. In FIG. 17, the despreading circuit part 93 includes a bit despreading circuit(s) 121 (in this embodiment, bit despreading circuits 121a and 121b) to which corresponding analog modulated signals ZA [2] are supplied from its terminal I. Further, a strobe signal from its terminal Strobe, a load signal from its terminal LD, and a clock from its terminal CK are also supplied to the bit despreading circuits 121a and 121b. Further, initial spread codes from its terminal Sci are supplied to the bit despreading circuits 121a and 121b in order.

Each of the bit despreading circuits 121a and 121b performs despreading on the analog modulated signals input to its terminal ZA and outputs bits $I_0$, $Q_0$. The bits $I_0$, $Q_0$ output from the bit despreading circuits 121a and 121b are converted into digital signals in corresponding signal converting circuits 122a through 122d and output as bits D [3] through D [0].

Figure 18:
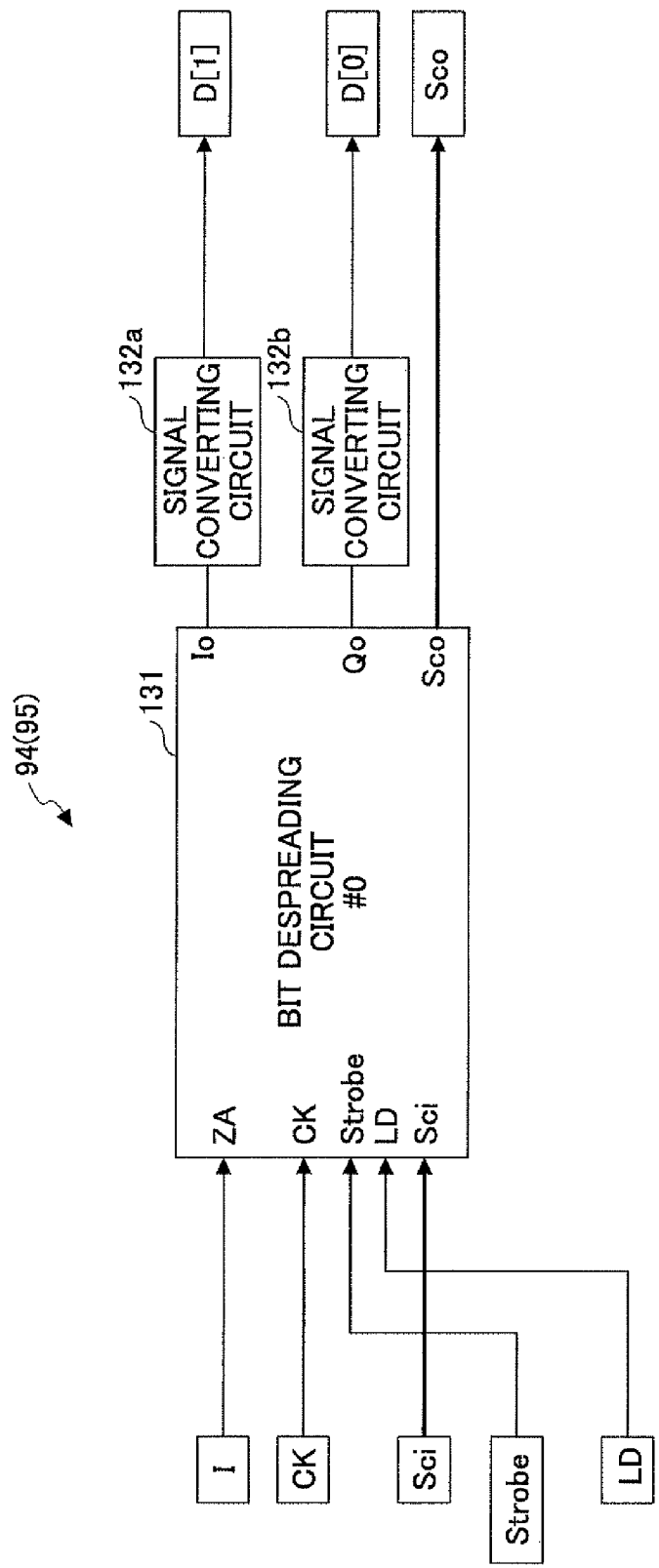
FIG. 18 is a block diagram illustrating an F-type despreading circuit part according to an embodiment of the present invention.

FIG. 18 is a block diagram illustrating the F-type despreading circuit 94 (95) according to an embodiment of the present invention. In FIG. 18, the despreading circuit part 94 (95) includes a bit despreading circuit 131 to which corresponding analog modulated signals ZA [1] or ZA [0] are supplied from its terminal I. Further, a strobe signal from its terminal Strobe, a load signal from its terminal LD, and a clock from its terminal CK are also supplied to the bit despreading circuit 131. Further, initial spread codes from its terminal Sci are supplied to the bit despreading circuits 131.

The bit despreading circuit 131 performs despreading on the analog modulated signals input to its terminal ZA and outputs bits $I_0$, $Q_0$. The bits $I_0$, $Q_0$ output from the bit despreading circuit 131 are converted into digital signals in corresponding signal converting circuits 132a and 132b and output as bits D [1] and D [0].

Figure 19:
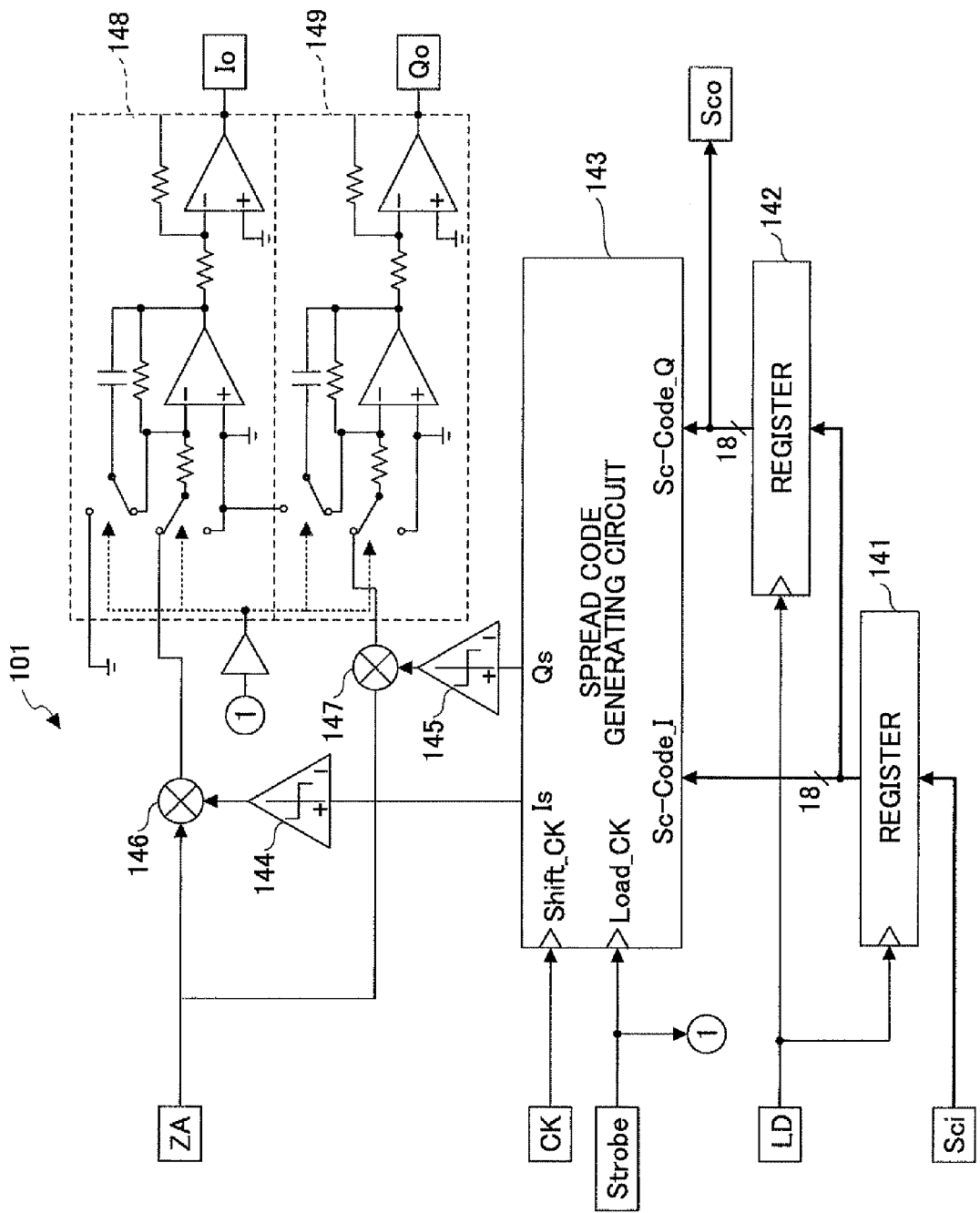
FIG. 19 is a block diagram illustrating a bit despreading circuit according to an embodiment of the present invention.

FIG. 19 is a block diagram illustrating the bit despreading circuit 101. The initial value of the spreading signal supplied from its terminal Sci is latched to registers 141 and 142 according to a load signal supplied from its terminal LD and supplied to a spread code generating circuit 143 from the registers 141, 142. The initial value of the spreading signal is input to the spread code generating circuit 143 according to a strobe signal supplied from the terminal Strobe.

The spread code generating circuit 143 generates two different kinds of spread codes according to a shift clock supplied from a terminal CK and supplies the generated spread codes to exclusive OR circuits 146, 147 via buffers 144, 145. In each of the buffers 144 and 145, signals supplied from the spread code generating circuit 143 indicating 0 or 1 are converted into analog signals indicating −1 or +1 and supplied to corresponding exclusive OR circuits 146, 147. The analog modulated signal of 1 bit supplied from the terminal ZA is supplied to the exclusive OR circuits 146, 147.

Each of the exclusive OR circuits 146, 147 performs a despreading process on the analog modulated signals using the two different kinds spread codes. The despread signals obtained from the despreading process are integrated in each symbol period by corresponding symbol integrators 148, 149. The symbol integrators 148, 149 output the integrated signals to corresponding terminals $I_0$, $Q_0$.

Figure 20:
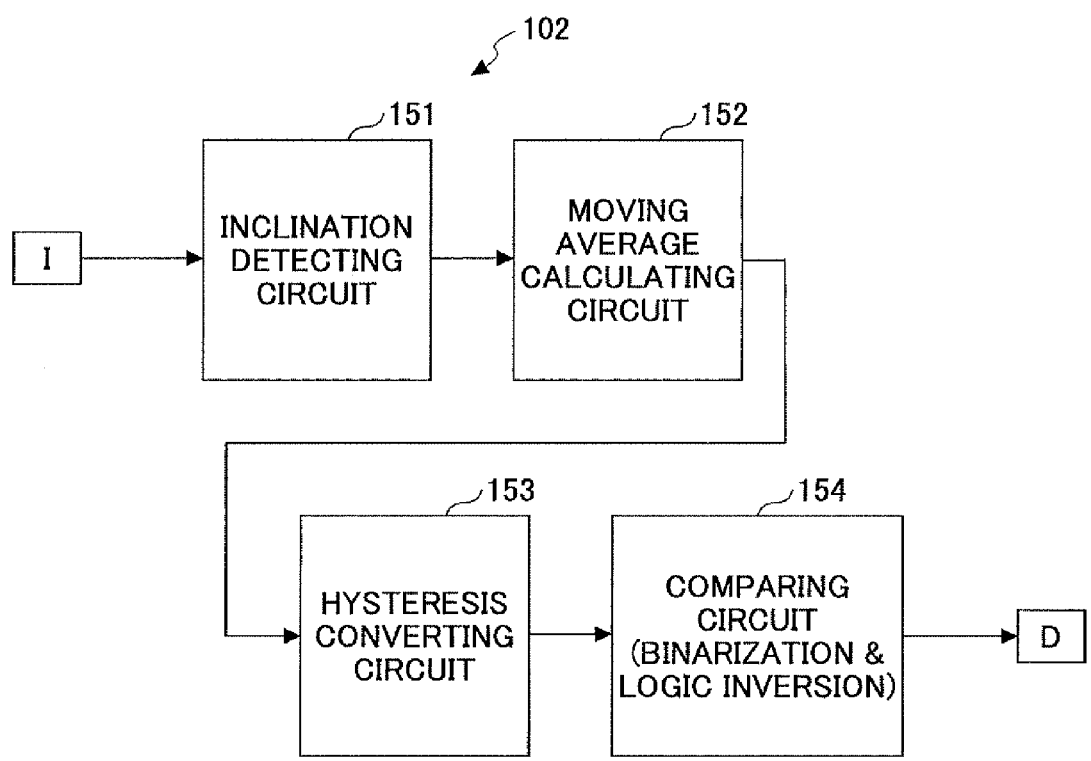
FIG. 20 is a block diagram illustrating a signal converting circuit according to an embodiment of the present invention.
Figure 21A:
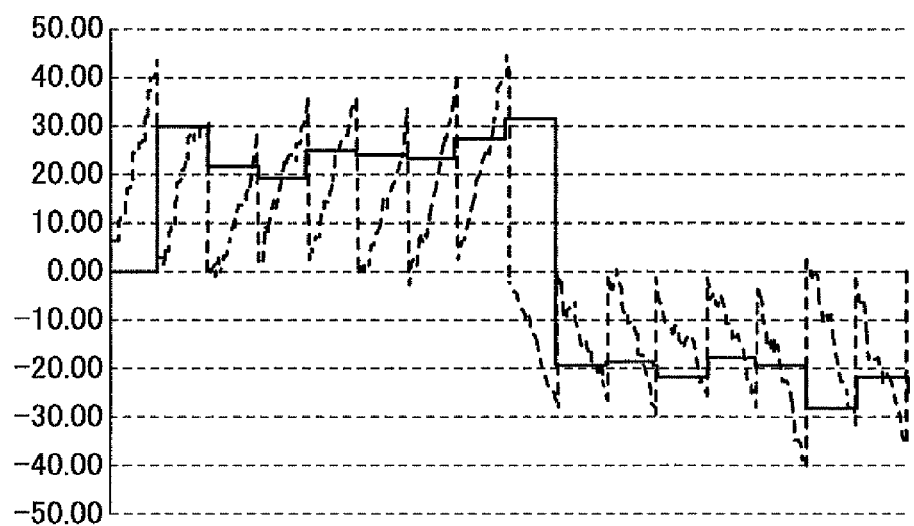
FIGS. 21A and 21B are graphs illustrating waveforms of signals of each part of the signal converting circuit according to an embodiment of the present invention.

FIG. 20 is a block diagram illustrating the signal converting circuit 102 according to an embodiment of the present invention. The signal converting circuit 102 has an inclination detecting circuit 151 for detecting (determining) the inclination of waveforms of the integrated signals (in this example, illustrated with broken lines in FIG. 21A) supplied from the terminal I. By the inclination detection, inclination detection signals of, for example, the waveforms illustrated with solid lines in FIG. 21A can be obtained.

Figure 21B:
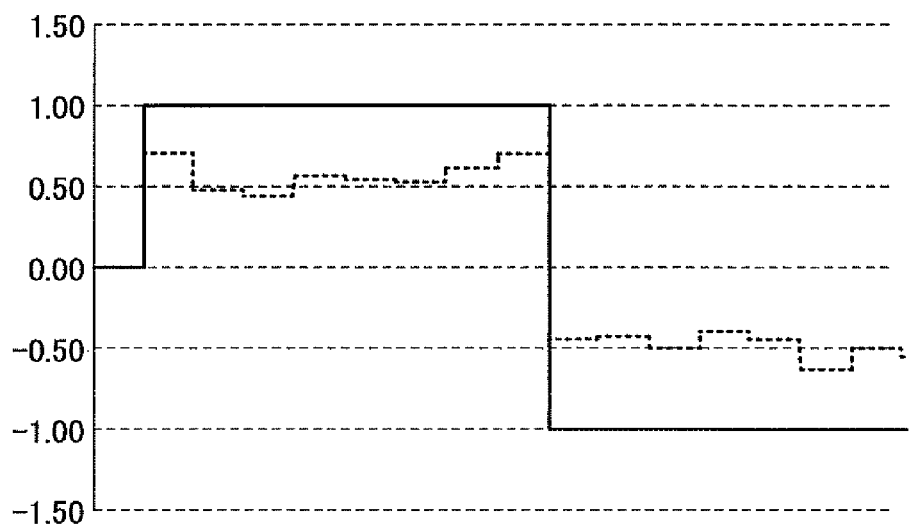

The inclination signals are supplied to a moving average calculating circuit 152. Then, a hysteresis converting circuit 153 applies a hysteresis characteristic to the value of the moving average obtained by the moving average calculating circuit 152. That is, in a case where the amount of change of the moving average surpasses a threshold, the direction of the change is switched. Thereby, a waveform, for example, illustrated with broken lines in FIG. 21B is assumed. The hysteresis converting circuit 153 serves to mathematically remove high frequency (spike) noise that could not be removed by obtaining the moving average of the inclination value (differential signal) (i.e., by performing a low pass filter process). The hysteresis converting circuit 153 uses past history of digitally sampled signals to remove the high frequency (spike) noise. Nevertheless, the hysteresis converting process is not a requisite and other alternative methods for removing sporadic spike noise may be used.

The signal output from the hysteresis converting circuit 153 is binarized by comparing the output signal with a predetermined threshold and is assumed as a waveform, for example, illustrated with solid lines in FIG. 21B. Further, the binarized signal is logically inverted by a comparing circuit 154, to thereby output a digital signal of 1 bit.

Figure 22B:
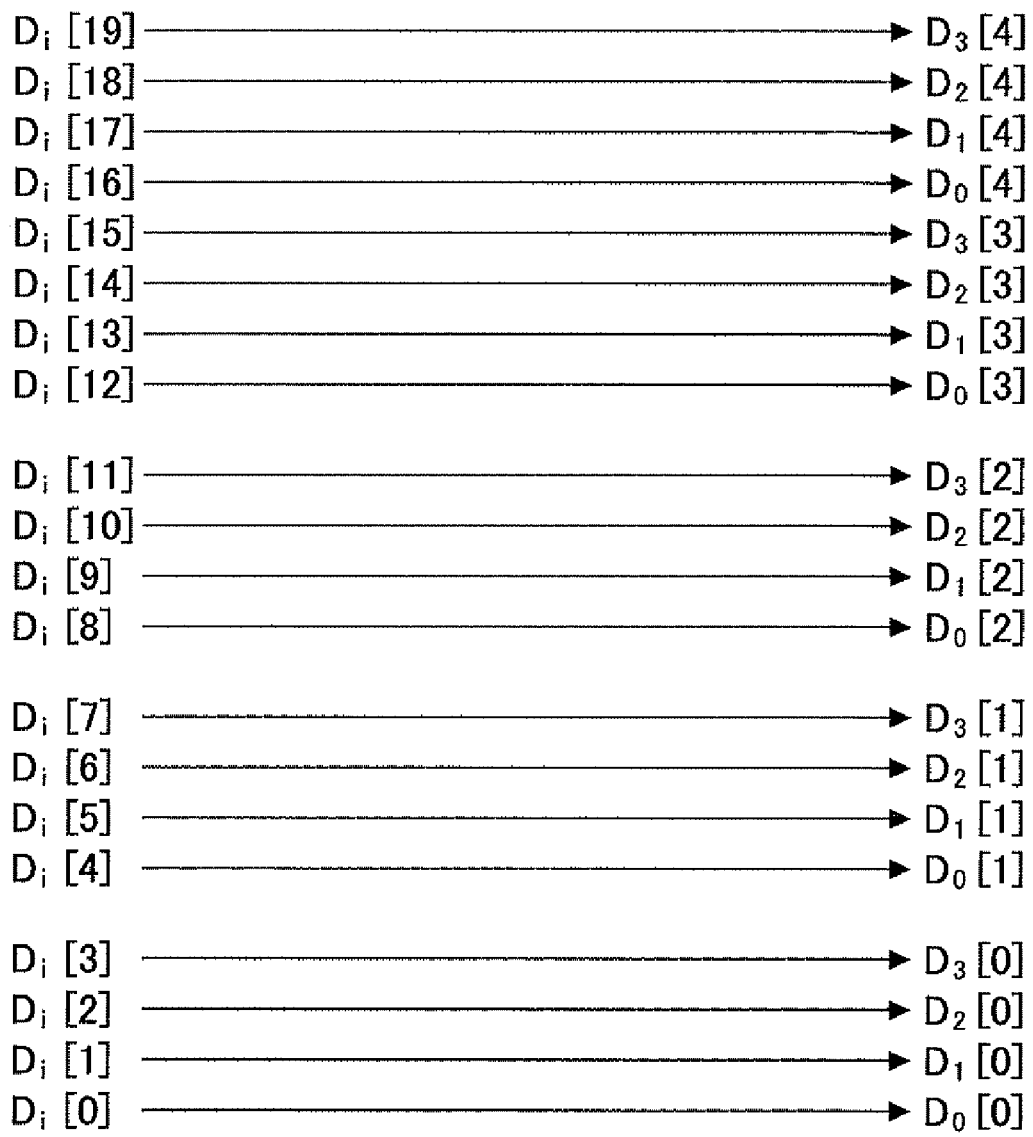

FIGS. 22A and 22B are diagrams for describing a function of the DMUX circuit 97 according to an embodiment of the present invention. The DMUX circuit 97 is configured to rearrange the order of signals. In FIG. 22A, the signals $D_i$ [35] through $D_i$ [32] supplied from the despreading circuit part 91 are output as signals $D_3$ [8] through $D_0$ [8]. It is to be noted that $D_3$ [8] represents the eighth bit of digital signal $D_0$. Likewise, the signals $D_i$ [31] through $D_i$ [28] supplied from the despreading circuit part 91 are output as signals $D_3$ [7] through $D_0$ [7]. Further, the signals $D_i$ [27] through $D_i$ [24] supplied from the despreading circuit part 91 are output as signals $D_3$ [6] through $D_0$ [6]. Further, the signals $D_i$ [23] through $D_i$ [20] supplied from the despreading circuit part 91 are output as signals $D_3$ [5] through $D_0$ [5].

In FIG. 22B, the signals $D_i$ [19] through $D_i$ [16] supplied from the despreading circuit part 92 are output as signals $D_3$ [4] through $D_0$ [4]. Further, the signals $D_i$ [15] through $D_i$ [12] supplied from the despreading circuit part 92 are output as signals $D_3$ [3] through $D_0$ [3].

Further, the signals $D_i$ [11] through $D_i$ [8] supplied from the despreading circuit part 93 are output as signals $D_3$ [2] through $D_0$ [2].

Further, the signals $D_i$ [7] and $D_i$ [6] supplied from the despreading circuit part 94 are output as signals $D_3$ [1] through $D_0$ [1]. Further, the signals $D_i$ [5] and $D_i$ [4] supplied from the despreading circuit part 95 are output as signals $D_1$ [1] through $D_0$ [1]. Further, the signals $D_i$ [3] through $D_i$ [0] corresponding to digital signals ZD [3:0] are output as signals $D_3$ [0] through $D_0$ [0].

In the above-described embodiment of the present invention, 36 (9 bits×4) signal lines are divided into four groups of multiples of 2 (2-squared) lines (2 lines, 4 lines, 8 lines, 16 lines) in an order starting from the lower bits where 4 lines of the least significant bits (LSB) of each A/D converter are not included. Furthermore, each group is spread by using different spread frequencies. Thereby, the spread frequencies for spreading and multiplexing the signals of each of the groups are:

First group: 2×{2×(50/2 MHz)}=100 MHz
Second group: 4×(50/4 MHz)=50 MHz
Third group: 8×(50/8 MHz)=50 MHz
Fourth group: 16×(50/16) MHz)=50 MHz.

Accordingly, by adding the diffusion frequencies of the four groups and the frequency of non-converted signals (LSB) (4 signal lines×50 MHz), the energy required for transmission becomes equivalent to 450 MHz (4×50 MHz+100 MHz+50 MHz+50 MHz=450 MHz).

Compared to the related art example requiring a transmission power of 1800×α mW illustrated in FIGS. 1A and 1B, transmission power of the above-described embodiment of the present invention can be reduced to 450×α mW.

In a typical wireless apparatus, it is difficult to obtain encoded signals and phase information of spread codes only from signals. Therefore, the typical wireless apparatus requires to spread a known test signal (pilot signal), transmit the spread signal, and use a matched filter or a sliding correlator for selecting a signal or obtaining phase information. However, with the above-described embodiment of the present invention performing transmission between the transmitting apparatus 300 and the receiving apparatus 310 by wire, since a strobe signal and a clock can be provided at the same time of transmitting spread signals, the embodiment of the present invention requires no synchronizing control circuit such as a matched filter. Thereby, the amount of circuits can be reduced.

The frequency of the strobe signal may be represented as (reference clock frequency) (single data bit length×number of data items of one block of data). According to the sampling edge cycle of the above-described embodiment of the present invention, the frequency of the strobe signal is approximately no greater than 2.7 MHz. Therefore, from the aspect of power, the frequency of the strobe signal according to the above-described embodiment of the present invention is at a level which can be ignored.

Accordingly, the signal transmitting method according to the above-described embodiment of the present invention can be achieved with, for example, a configuration including approximately 1000 flip-flops and several hundreds of logic gate circuits (exclusive OR circuits and OR circuits). That is, the signal transmitting method according to the above-described embodiment of the present invention can reduce the number of circuit devices to, for example, approximately 2000 gates.

Further, the present invention is not limited to these embodiments, but various variations and modifications may be made without departing from the scope of the present invention.

What is claimed is:

1. A signal transmitting method comprising:
   a) categorizing a plurality of digital signals, obtained by performing A/D conversion on a plurality of analog signals consecutively arranged in a time direction, into a plurality of signal groups in an order starting from lower bits of the plural digital signals;
   b) performing code spreading on the plural digital signals by using a different spread frequency for each signal group and using different spread codes for each consecutive bit of each signal group;
   c) multiplexing the spread digital signals; and
   d) transmitting the multiplexed plural digital signals.

2. The signal transmitting method as claimed in claim 1, wherein the plural digital signals are categorized into groups of bits being multiples of 2, wherein the plural digital signals are categorized starting from the lower bit subsequent to the least significant bit of the plural digital signals.

3. The signal transmitting method as claimed in claim 2, wherein the least significant bit of the plural digital signals is transmitted separately from the other plural digital signals.

4. The signal transmitting method as claimed in claim 3, wherein a strobe signal and a clock are transmitted together with the multiplexed plural digital signals and the least significant bit of the plural digital signals.

5. The signal transmitting method as claimed in claim 4, wherein the strobe signal, the clock, the multiplexed digital signals, and the least significant bit of the plural digital signals are transmitted by wire.

6. A transmitting apparatus comprising:
   an A/D converting part configured to perform A/D conversion on a plurality of analog signals consecutively arranged in a time direction;
   a code spreader configured to categorize the plural digital signals into a plurality of signal groups in an order starting from lower bits of the plural digital signals and perform code spreading on the plural digital signals by using a different spread frequency for each signal group and using different spread codes for each consecutive bit of each signal group; and
   a multiplexer configured to multiplex the spread plural digital signals of each signal group and transmit the multiplexed plural digital signals.

7. The transmitting apparatus as claimed in claim 6, wherein the code spreader is configured to categorize the plural digital signals into groups of bits being multiples of 2, wherein the plural digital signals are categorized starting from the lower bit subsequent to the least significant bit of the plural digital signals.

8. The transmitting apparatus as claimed in claim 7, the transmitting apparatus comprise a transmitter configured to transmit the least significant bit of the plural digital signals separately from the other plural digital signals.

9. The transmitting apparatus as claimed in claim 8, wherein the transmitter is configured so that a strobe signal and a clock are transmitted together with the multiplexed plural digital signals and the least significant bit of the plural digital signals.

10. A receiving apparatus for receiving a plurality of multiplexed digital signals, the multiplexed plural digital signals being obtained by categorizing a plurality of digital signals, obtained by performing A/D conversion on a plurality of analog signals consecutively arranged in a time direction, into a plurality of signal groups in an order starting from lower bits of the plural digital signals, performing code spreading on the plural digital signals by using a different spread frequency for each signal group and using different spread codes for each consecutive bit of each signal group, and multiplexing the spread digital signals, the receiving apparatus comprising:
- a despreader configured to despread the multiplexed plural digital signals for each bit by using different spread codes; and
- a separating part configured to separate the plural digital signals from the despread multiplexed plural digital signals.

11. The receiving apparatus as claimed in claim 10, further includes
- a moving average calculator configured to obtain a moving average value of an inclination of the integrated multiplexed plural digital signals, and
- a binarizing part configured to binarize the moving average value.

12. The receiving apparatus as claimed in claim 10, the receiving apparatus comprises a receiver configured to receive a strobe signal and a clock that are transmitted together with the multiplexed plural digital signals, wherein the despreader is configured to despread the multiplexed plural digital signals in synchronization with the strobe signal and the clock.

* * * * *